(12) United States Patent
Peters et al.

(10) Patent No.: US 8,965,571 B2
(45) Date of Patent: Feb. 24, 2015

(54) BRICK LAYING SYSTEM

(75) Inventors: Scott Lawrence Peters, Rochester, NY (US); Nathan Podkaminer, Jamesville, NY (US); Thomas Charles Coller, Honeoye Falls, NY (US)

(73) Assignee: Construction Robotics, LLC, Jamesville, NY (US)

( * ) Notice: Subject to any disclaimer, the term of this patent is extended or adjusted under 35 U.S.C. 154(b) by 576 days.

(21) Appl. No.: 13/207,328

(22) Filed: Aug. 10, 2011

(65) Prior Publication Data
US 2012/0053726 A1 Mar. 1, 2012

Related U.S. Application Data

(60) Provisional application No. 61/373,202, filed on Aug. 12, 2010.

(51) Int. Cl.
*E04G 21/22* (2006.01)
*B25J 5/04* (2006.01)

(52) U.S. Cl.
CPC .............. *E04G 21/22* (2013.01); *Y10S 901/02* (2013.01); *Y10S 901/30* (2013.01)
USPC ............... 700/245; 901/2; 901/30; 52/749.14

(58) Field of Classification Search
CPC ............ E04G 21/22; E04C 2/042; B25J 5/04; B25J 5/06; B25J 9/162; G05B 2219/45086
USPC ........ 700/245, 247, 252, 258; 901/1, 2, 9, 48; 52/749.14; 414/10, 931
See application file for complete search history.

(56) References Cited

U.S. PATENT DOCUMENTS

| 3,659,392 A | 5/1972 | Stoltz |
| 3,757,484 A | 9/1973 | Williamson et al. |

(Continued)

FOREIGN PATENT DOCUMENTS

| ES | 2 323 620 B2 | 7/2009 |
| WO | WO 2004/083540 A2 | 9/2004 |

(Continued)

OTHER PUBLICATIONS

PCT International Search Report and Written Opinion for International Application No. PCT/US 2011/047462; Date of Mailing Jan. 9, 2012. 8 pages.

(Continued)

*Primary Examiner* — Spencer Patton
(74) *Attorney, Agent, or Firm* — Patent Technologies, LLC; Robert D. Gunderman, Jr.

(57) ABSTRACT

A brick laying system where an operator such as a mason works proximate a moveable platform having a robotic arm assembly, a mortar applicator with a mortar transfer device, and a brick transfer device to build structures. The robotically assisted brick laying system may also contain a stabilizer having a disturbance sensing and a disturbance correcting component that provides compensation for disturbances caused by load shifting, movement of the platform, wind, operator movement, and the like. In addition, the robotically assisted brick laying system has a sensing and positioning component for controlling placement of the moveable platform and robotic arm assembly. The interoperability of the system with a mason or skilled operator removes much of the manual labor component of brick laying, allowing the mason more time to focus on craftsmanship and quality, thus improving the end product and the overall working conditions of the mason.

15 Claims, 30 Drawing Sheets

(56) References Cited

U.S. PATENT DOCUMENTS

| | | |
|---|---|---|
| 3,782,047 A | 1/1974 | Stoltz |
| 3,799,714 A | 3/1974 | Vetovitz |
| 3,950,914 A | 4/1976 | Lowen |
| 4,060,955 A | 12/1977 | Lachnit |
| 4,106,259 A | 8/1978 | Taylor-Smith |
| 4,245,451 A | 1/1981 | Taylor-Smith |
| 4,443,994 A | 4/1984 | Petzinger |
| 4,688,773 A | 8/1987 | Legille et al. |
| 4,758,036 A | 7/1988 | Legille et al. |
| 4,765,789 A | 8/1988 | Lonardi et al. |
| 4,786,227 A | 11/1988 | Kremer et al. |
| 4,787,796 A | 11/1988 | Melan et al. |
| 4,827,689 A | 5/1989 | Lonardi et al. |
| 4,911,595 A | 3/1990 | Kirchen et al. |
| 5,018,923 A | 5/1991 | Melan et al. |
| 5,197,847 A | 3/1993 | Kremer et al. |
| 5,284,000 A | 2/1994 | Milne et al. |
| 5,419,669 A | 5/1995 | Kremer et al. |
| 5,489,032 A | 2/1996 | Mayhall, Jr. et al. |
| 6,370,837 B1 | 4/2002 | McMahon et al. |
| 6,868,847 B2 | 3/2005 | Ainedter et al. |
| 7,111,437 B2 | 9/2006 | Ainedter |
| 2003/0229998 A1 | 12/2003 | Ainedter |
| 2009/0038258 A1 | 2/2009 | Pivac et al. |

FOREIGN PATENT DOCUMENTS

| | | |
|---|---|---|
| WO | WO 2007/076581 A1 | 7/2007 |
| WO | WO 2009/026641 A1 | 3/2009 |
| WO | WO 2009/026642 A1 | 3/2009 |
| WO | WO 2009/044002 A1 | 4/2009 |

OTHER PUBLICATIONS

Gambao et al., Robot Assembly System for Computer-Integrated Construction, journal article, Sep. 2000, 479-487, Automation in Construction/Elsevier. city/country not specified.

BRICK LAYING SYSTEM

CROSS REFERENCE TO RELATED PATENT APPLICATIONS

This application claims priority to U.S. Patent Application Ser. No. 61/373,202 filed Aug. 12, 2010 entitled "Brick Laying System" by Peters, Podkaminer, Rock, Puffer, Kleinigger, Gullotta, and Coller. The entire disclosure of this U.S. Patent Application Ser. No. 61/373,202 is incorporated herein by reference in its entirety, including all specifications, drawings, and appendices.

BACKGROUND OF THE INVENTION

1. Field of the Invention

The present invention relates generally to automated construction equipment, and more particularly to a Brick Laying System.

2. Description of Related Art

The work of a mason typically involves manual labor to move and place bricks, and to apply mortar to the bricks. Brick structures are desirable for a variety of reasons, including their structural integrity, low maintenance costs, and longevity. Unfortunately the labor costs to construct a brick building are significantly higher than that of other building materials such as wood. Mason work is also prone to worker related injuries due to accidents, muscle and skeletal fatigue, and the like. Mason work is slow and physically demanding, and also requires a skilled workforce. As the skill of a mason goes up, so does the labor cost of that individual. Many projects require a mason of a certain skill level due to the overall complexity of the project or the need for technical or aesthetic excellence. Mason work, and specifically brick laying, has seen little in the way of automation, and is still a labor intensive, slow process.

The Brick Laying System of the present invention does not attempt to replace a brick mason, but rather amplifies the impact of the mason while taking over the most repetitious of tasks. A brick mason works next to a robot positioned on a platform. While the robot is applying precise amounts of mortar to each brick and placing it with better-than-human accuracy, the brick mason can concentrate on the art of pointing, perform other finishing work, and secure tie-backs for subsequent brick courses as construction progresses. It is estimated that a typical crew of 12 could be replaced with a crew of 5, resulting in cost reductions of greater than 60% and making masonry construction an economically viable alternative on a greater number of buildings, quite possibly leading to an increase in skilled employment in the trade. By facilitating more widespread use of brick construction, long-term energy and environmental benefits will be enjoyed for decades into the future, and when the building eventually must be replaced or updated, it will have a far smaller environmental impact than many alternative construction technologies since bricks can be reclaimed and in many cases reused.

Another major benefit of the present invention is the potential energy savings that could be attained by more rapid completion of masonry work on buildings. In the Northeast, it is not uncommon for temporary heating costs during winter months to average $25.000-$30,000 per month per site—most of which is spent for propane. Expediting the labor intensive act of brick or block laying can pay an immediate dividend through reduced energy consumption during the build. We believe that even with a labor reduction of one third, we can achieve an overall project time reduction of one half. For example, instead of a 25,000 brick job taking roughly 20 days, our process would complete it in less than 10. This savings in propane alone would add up to about 8.000 lbs of propane, greater than 101.000 lbs of carbon dioxide emissions, and an energy cost savings of roughly $8,000.

Yet another energy and environmental benefit of this process would be its ability to enable greater use of brick by reducing the high cost and increasing both the capacity for laying brick and speed at which brick work can be laid. Brick provides many environmental benefits as a wall cladding material. Brick is estimated to save roughly 8% in energy costs as compared to other conventional materials. It also has a greater than 50% lower embodied energy than other conventional building materials such as Vinyl and Aluminum, as demonstrated by the BEES (Building for Environmental and Economic Sustainability, NIST modeling software) analysis. Brick also has a significantly longer life than most competitor products and is 100% recyclable. Another added benefit to using brick is the increased thermal mass, which is very useful in passive solar applications to reduce peak energy loads, help achieve overall load leveling and facilitate the specification of downsized HVAC equipment.

Fielding a completely autonomous robot in the uncertain environment of a construction site is a prescription for disaster. Human perception and judgment are essential for success, and the present invention marries the best of human machine operation with industrial automation. The ultimate goal and best way to ensure success is to apply automation as a force multiplier for people, rather than as their replacement.

It is therefore an object of the present invention to provide a robotically assisted brick laying system. It is another object of the present invention to provide a robotically assisted brick laying system that allows a mason or skilled worker to work alongside the Brick Laying System. It is yet another object of the present invention to provide a robotic arm assembly for assisting with the task of bricklaying. It is another object of the present invention to provide a method for laying bricks that comprises operating a robotic arm assembly that assists with the task of bricklaying.

BRIEF SUMMARY OF THE INVENTION

In accordance with the present invention, there is provided a robotically assisted brick laying system comprising a gantry having a moveable platform, a robotic arm assembly mounted to the moveable platform, control software operatively coupled to said robotic arm assembly, a mortar applicator mounted to the moveable platform, a mortar transfer device operatively coupled to said mortar applicator, a brick transfer device, and a sensing and positioning component controlling placement of the moveable platform and robotic arm assembly.

The foregoing paragraph has been provided by way of introduction, and is not intended to limit the scope of the invention as described by this specification, drawings and claims.

BRIEF DESCRIPTION OF THE DRAWINGS

The invention will be described by reference to the following drawings, in which like numerals refer to like elements, and in which.

Figure 1:
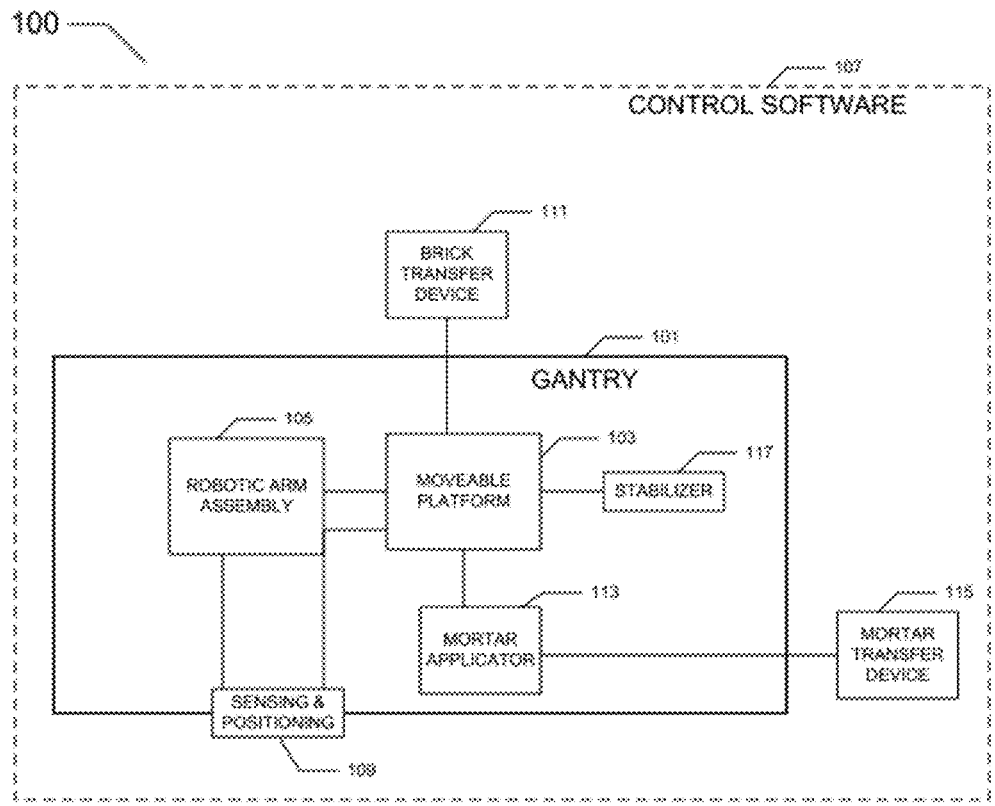
FIG. 1 is a functional block diagram of the Brick Laying System with a moveable platform.

The present invention will be described in connection with a preferred embodiment, however, it will be understood that there is no intent to limit the invention to the embodiment described. On the contrary, the intent is to cover all alternatives, modifications, and equivalents as may be included within the spirit and scope of the invention as defined by this specification, drawings, and claims.

DESCRIPTION OF THE PREFERRED EMBODIMENTS

A portion of the disclosure of this patent document contains material which is subject to copyright protection. The copyright owner has no objection to the facsimile reproduction by anyone of the patent document or the patent disclosure, as it appears in the Patent and Trademark Office patent files or records, but otherwise reserves all copyrights whatsoever.

For a general understanding of the present invention, reference is made to the drawings. In the drawings, like reference numerals have been used throughout to designate identical elements.

The present invention will be described by way of example, and not limitation. Modifications, improvements and additions to the invention described herein may be determined after reading this specification and viewing the accompanying drawings; such modifications, improvements, and additions being considered included in the spirit and broad scope of the present invention and its various embodiments described or envisioned herein.

Referring first to FIG. 1, a functional block diagram of the Brick Laying System 100 of the Present Invention is depicted. Throughout this specification, the term brick is used to generically refer to any building component that can be placed in a repetitive pattern for the construction of a wall, column, partition, ledge, retention structure, and the like. This specification further describes the use of mortar to bond bricks together. Mortar, as used herein, may be masonry based, polymer based, adhesive based, or may be any material that serves to fill space between bricks and may further adhere one brick to another brick. In some embodiments of the present invention, the Brick Laying System may not use mortar whatsoever, but may dry set bricks onto each other, or rely on other fastening devices, such as, but not limited to, clips, pins, tabs, or the like.

Each of the components depicted in FIG. 1 will be described in further detail; however, a general overview of the major functional blocks of the present invention will assist in a complete understanding of the present invention and the various embodiments that may manifest themselves. Some embodiments of the present invention may eliminate or substitute the various major functional blocks, such substitution and elimination being normal and considered to be included in the spirit and broad scope of the present invention.

In FIG. 1, a gantry 101 is depicted. The gantry is a physical structure that is placed in proximity to the wall or structure being constructed. A gantry may include, but is not limited to, a rough terrain lift, a cable suspended platform, a mast climbing scaffolding system, a crane suspended basket, traditional gantry, a scaffold, or the like. The gantry contains a moveable platform 103 such as a basket or a cart. The moveable platform 103 contains a robotic arm assembly 105. A robotic arm assembly is any device capable of position control, for example, Cartesian coordinate robots, 6 degree of freedom robots, electrically or pneumatically driven servo controlled actuators and automation devices, and the like. The operator is typically a skilled person who works with the robotically assisted brick laying system, ensuring that the system is functioning properly, performing ongoing quality control, and generally providing an overall level of craftsmanship that may be lacking in a fully automated system. The robotic arm assembly 105 moves and places the bricks in the proper position, and contains control software 107 as well as sensing and positioning components 109. Within, on, or in proximity to the gantry 101 is a brick transfer device 111 that moves the bricks from a bundle, pile, pallet or a temporary location into position such that the robotic arm assembly 105 is able to place the bricks in proper position. A mortar applicator 113 is used to dispense mortar onto the bricks as they are being placed in proper position (laid). A mortar transfer device 115 is operatively coupled to the mortar applicator 113 for moving mortar from a retention vessel or container through the mortar applicator 113. As the robotically assisted brick laying system operates, the moveable platform 103 and the various components that are mechanically interoperable with the moveable platform 103 may sway and move in unintended ways due to changes in weight conditions, load distribution, wind, and other job site conditions. A stabilizer system 117, as will be further described herein, is required in order to deal with such changing conditions.

Figure 2:
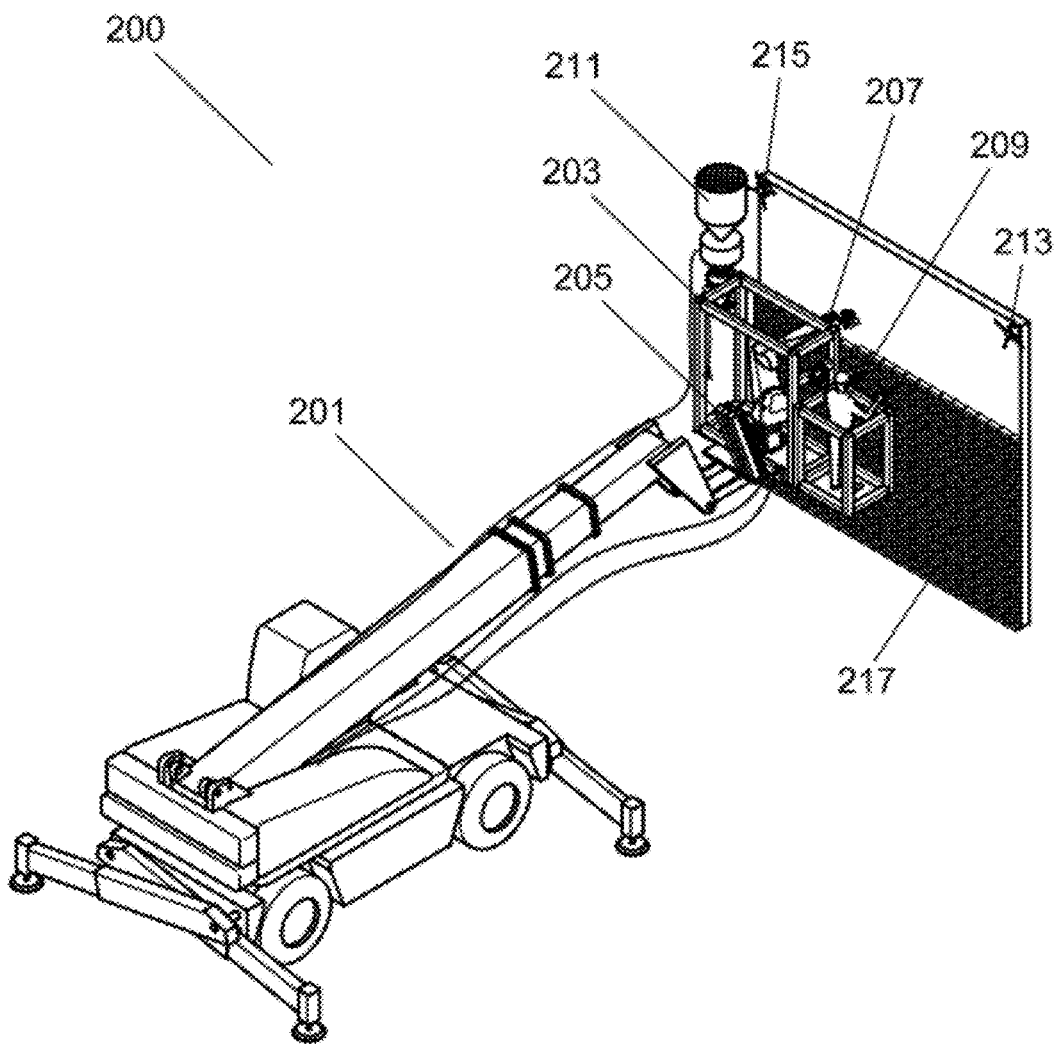
FIG. 2 is an exemplary perspective view of the Brick Laying System.

FIG. 2 is an exemplary perspective view of the Brick Laying System 200. Shown is a lift 201 having a moveable platform 203, a brick transfer device 205, a robotic arm assembly 207 mounted to the moveable platform 203, and an operator 209. The operator 209 is not considered part of the invention, but rather, depicts the brick laying system in use. Further depicted in FIG. 2 is a mortar transfer device 211 that transfers mortar to a nozzle as is further depicted and described by way of FIG. 3. The mortar transfer device 211 comprises a mixer, a pump, a dry hopper and optionally a pressure vessel. A first sensing and positioning device 213 and a second sensing and positioning device 215 are depicted near the brick wall under construction 217. Such sensing and positioning devices may include, for example, a spinning laser device, an ultrasonic device, an optical device, or the like.

Fielding a completely autonomous robot in the uncertain environment of a construction site is a prescription for disaster. Human perception and judgment are essential for success, and the present invention marries the best of human machine operation with industrial automation. The ultimate goal and best way to ensure success is to apply automation as a force multiplier for people, rather than as their replacement.

In some embodiments of the present invention, a commercially available rough terrain fork lift with remote operation capability may be used. An industrial robot/robotic arm assembly will be positioned and appropriately guarded on a work platform, and mechanisms for brick feeding, and mortar mix and metering will be accessible to the robot. A mason or skilled operator will also occupy a portion of the rough terrain lift work platform, and they will have responsibility for all lift platform motions, tooling the joint, quality control, ensuring the feeding and functionality of the automation, and the like. As depicted in FIG. 2, the mason operator occupies a dedicated area on a platform on a side of the robot sub-system. Other configurations of robotic arm assembly and mason operator may also be employed.

Equipment offerings from Terex and Manitou, for example, allow remote operation from a work platform attachment to a rough terrain lift. However, commercial off the shelf work platforms are not suitable for integration with a robot directly without the techniques as described herein, and therefore appropriate end-of-boom hardware must be used that provides both robot and mason access to the wall surface.

Figure 3:
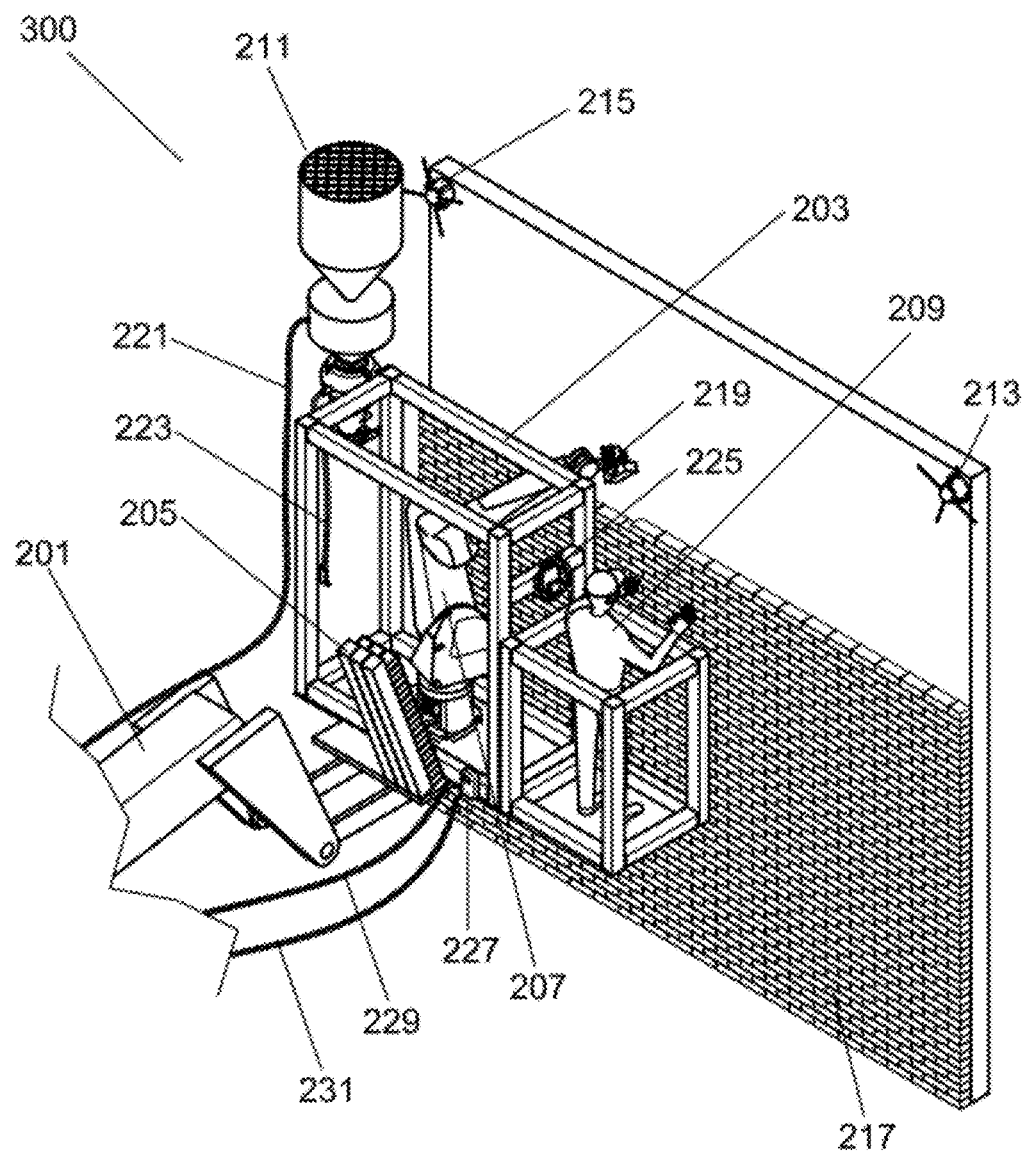
FIG. 3 is a perspective view of the moveable platform of the present invention.

Maximizing brick laying efficiency requires that the lift traverse the wall and lay brick in a bi-directional pattern. However, in operation, the mason must necessarily follow, rather than lead, the robot so that clean-up and quality control functions can be performed. Payload considerations suggest the robot and feedstock be centered on the boom, yet it is desirable for the system to permit robot access to interior corners of buildings. Thus, in some embodiments of the present invention, the operator work platform must be capable of shifting between left and right sides of the robot work envelope. FIGS. 2 and 3, by way of example and not limitation, illustrates a configuration where the mason is on the right side of the robot, thus suggesting the robot would be proceeding from right to left laying bricks along the wall.

In one embodiment of the present invention, a safe zone or series of safe zones is established on the work platform where a series of hard stops are provided along an axis such as the x-axis (width) to prevent robot motion in the space of an operator.

FIG. 3 is a perspective view of the moveable platform of the present invention. In this exemplary illustration, bricks are supplied from a brick transfer device 205. In other embodiments of the present invention, alternative modular brick feeding approaches may be employed such as pre-loaded magazines, pallets, or magazines that sort by color, size, texture, shape, and the like.

To minimize the size of the robotic arm assembly and provide the most ergonomic experience to the mason, it is desirable to have the basket positioned in relatively close proximity to the wall. In some embodiments of the present invention, basket rotation and movement is by way of an electrically actuated control. In other embodiments of the present invention, basket rotation and movement is by way of hydraulics, gearing, electric motors, cables, and the like.

On a commercially available work platform over-weight sensing in the basket is commonly achieved by relying on compression springs and a limit switch for sensing basket overload. This approach in some embodiments of the present invention may be undesirable as it adds additional spring dynamics to the robot base and introduces additional error in brick placement. Utilizing a load cell will minimize parasitic motion and also provide a range of feedback on payload weight that may be useful for ancillary purposes such as gauging feedstock consumption.

Even without a sprung basket, and in spite of the considerable rigidity of many commercially available lifts, the work platform will still experience considerable disturbance caused by the mason, reaction forces from automation and robotics on the work platform, repositioning of the platform, and wind. Although utilizing a commercially available lift provides considerable flexibility to navigate the job site and enables rapid setup, these disturbances must be compensated or controlled. Disturbance compensation is most practical, and the present invention may, in some embodiments, use sensing technology that is capable of measuring the work platform position such that these disturbances can be compensated for by the industrial robot laying brick. Both stabilization and disturbance compensation may be used in the present invention by way of novel techniques further described herein. It is important to note the differences between stabilization and disturbance compensation and the various inventive techniques used to accomplish each of them.

Work platform stabilization is the act of taking measures and actions to minimize unintended motion of the work platform. Examples include, but are not limited to a counter mass under active feedback control to cancel out undesirable platform motion, at least for some finite period of time. For example, minimizing platform disturbance just during the time that the brick laying robot end effector is in close proximity or contact with the wall to increase the quality of the wall being constructed. Sensors such as accelerometers, gyroscopes, or external position based sensors may also be used to provide this feedback and the counter mass may, in some embodiments of the present invention, be movable in a variety of degrees of freedom (anywhere from 1 to 6 DOF) based on the typical/dominant motion of the work platform. The counter mass may, in some embodiments of the present invention, be a rigid article, such as a block of steel, or it may be water whose momentum could be controlled by a combination of one or more pumps and valves. The latter would give the possibility of conveniently changing the weight of the countermass over time, and allow the lift to be transported in a reduced weight configuration.

Alternatively, stabilization of the work platform may be accomplished by creating a linkage, whether a fixed linkage, steel cable, or the like, between the work platform and either the structure being built, a temporary sub-structure, or the ground. Several anchors on the ground with steel cables attached to the platform serve to dampen or prevent certain vibrational modes of the work platform. If these cables were connected to the work platform via a servo controlled actuated winch, it will be possible to coordinate motion of these respective winches to keep cables taught during desired motions of the work platform and control tension on these cables to minimize work platform disturbance after basket repositioning.

In disturbance compensation, work platform motion that is uncontrolled but beyond the rather small displacements tolerable while laying brick on the wall may be compensated by counteracting motions in a robot arm or other automation provided the robot/automation is able to respond at a faster rate than the work platform to which it is anchored is able to move, and further provided that the reaction forces of the robot/automation do not induce additional disturbance in the work platform that cannot be overcome through platform stabilization or damping by the prevailing system dynamics. In order to compensate for such disturbances, they must be sensed. This can be done using a variety of sensors. One embodiment described herein includes the use of ground based laser beacons that communicate with sensors on the work platform. Using known position and timings of the laser beacons, it is possible to triangulate work platform position and attitude. Additional sensors comprising an inertial measurement unit, or some subset thereof, may be useful to augment the ground based laser beacon position sensor subsystem and provide additional measurement fidelity or redundancy from which disturbance compensation control can be achieved. In one embodiment of the present invention, rotating laser beacons are set up such that they are parallel (and offset) from the wall being constructed. It is anticipated that the robot/automation will be operated in a disturbance compensating mode only during the length of time when it is mechanically communicating with or in close proximity to the wall under construction. At other times, it will operate in the reference frame of the disturbed work platform so that it can couple with other subsystems (brick supply, mortar application, quality control, mason) as may be present on the work platform.

FIG. 3 provides further details of the exemplary brick laying system of FIG. 2. The mortar transfer device 211 contains a pump for transferring mortar by way of a mortar feed line 221 through a mortar dispenser line 223 and to a nozzle for dispensing mortar. The nozzle is further described and depicted by way of FIGS. 9 and 10. Also depicted in FIG. 3 is a control panel 225 that provides the operator 209 with control of the brick laying system. A sensor, series of sensors or sensor array 227 can be seen senses position of the brick laying system and may be laser based, optical based, ultrasonic based, or the like. An air line 229 and a power line 231 can also be seen to provide power to the brick laying system. The end effector 219 may also be seen operatively coupled to the robotic arm assembly 207. The end effector provides for the grasping and placement of a brick or similar building element, and will be further described by way of FIGS. 6 and 7.

Figure 4A:
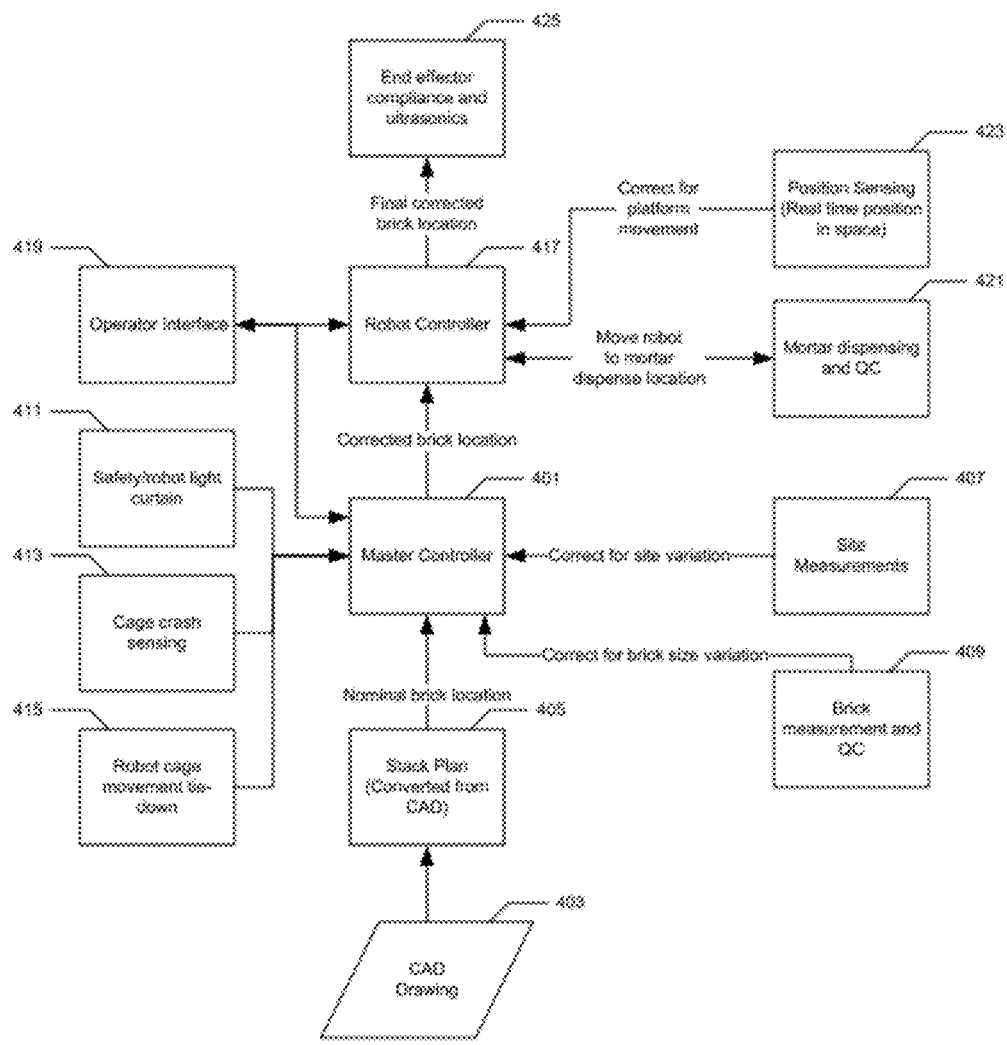
FIG. 4A depicts control system architecture of the present invention.

FIG. 4A depicts control system architecture of the present invention. In FIG. 4A, a CAD drawing 403 is converted to a stack plan 405. The stack plan will guide the material, sequence, and placement of bricks used to construct a wall. This may be manually created where architecture is relatively simple; however, in some embodiments of the present invention it will derive from an architectural computer-aided design (CAD) system interface. The stack plan 405 will feed information such as nominal brick location to the master controller 401 which is responsible for overall sequencing and control of the system, and an operator interface 419 will be provided as a means for communication between the mason and the brick laying automation. This is particularly important to facilitate exception handling, system pause/restart, and feedstock replenishment operations. The master controller 401 further accepts inputs such as site measurements 407 that can be used to correct for site variation. Brick measurement and quality assurance 409 using a device such as machine vision or optical measurement and gauging takes place to correct for brick size variation and this information is then passed to the master controller 401.

The master controller, which sequences the detailed operation of system elements, is shown in FIG. 4A tightly coupled with the robot controller 417, as it may be possible and desirable to integrate the overall system control logic within the robot controller 417. The master controller 401 passes information such as corrected brick location to the robot controller 417. In some embodiments of the present invention, it may also be necessary to employ a programmable logic controller (PLC), as is standard in many industrial automation systems, to synchronize overall system operation such that robot controller resources are focused only on robot arm operation. The robot controller 417 then coordinates end effector compliance and ultrasonics 425 with information such as the final corrected brick location.

The master controller 401 must signal the operator when platform motion is necessary. All work platform motion will be under mason control from the work platform. In one embodiment of the present invention, the control system for the platform will signal the operator when platform re-positioning is required to enable brick placement given the limits of reach of the robotic arm. In some embodiments of the present invention, additional safety devices may be employed, for example, a tie down system 415 where the mason must accept motion of work platform before motion actually occurs. A tie down system disables platform to motion at critical times or when safety sensors indicate the platform should not be moved in situations such as a potential crash into the wall being built. There may also be, in some embodiments of the present invention, programmable area guarding for robot cells, the use of light curtains, and the like. There may also be section-based mechanical interlock when dealing with the $7^{th}$ axis or a Cartesian system. Other safety devices, techniques, and methods may also be employed, for example, the platform requests motion in a particular direction and relies on the mason to operate the system. Safety such as a robot light curtain 411 may also be employed through the master controller.

At instances of brick contact with the wall, however, gross platform motion must be avoided. In some embodiments of the present invention, the system controller will have the ability to defeat platform motion that may be commanded by the mason. This is also an important capability, as it relates to platform/cage crash sensing. As noted previously, ergonomic considerations will likely drive the mason to prefer the brick laying system be quite close to the wall, however, if positioned too close, then disturbances could cause the platform to crash into the freshly built wall which could have disastrous consequences. By providing crash sensing 413 at the extremes of the platform, it will be possible to stop motion and alert the mason when repositioning of the work platform is at risk of leading to a crash with the wall.

Position sensing 423 employs, for example, at least two laser beacons setup to establish the plane of the wall to be constructed. Once these are set plumb and parallel to the desired wall surface through conventional surveying techniques, sensors on board the work platform and/or the robot end effector can be used to ascertain position and attitude with respect to the wall being built. This information will be communicated to the robot controller 417 such that it can be switched between two coordinate reference frames: one where the arm moves only relative to the work platform such that it can pick up a brick and apply mortar on the brick, and the second which is relative to the stationary wall being built where any platform disturbances are compensated by inverse movement in the robot. The position sensing component 423 corrects for platform movement through real time spatial data to and from the robot controller 417. Other embodiments include application of the mortar to the wall being built, pre-formed mortar application, or the like. This will naturally require a tight coupling (and potentially coordinated motion) with end-effector actuation, any end-effector sensing that may prove necessary and mortar dispensing and metering. In some embodiments of the present invention it may be desirable to enable the robot base to be repositioned such that a wider reach can be obtained from a smaller robot arm. Mortar dispensing and quality assurance 421 takes place with movement of the robot to the mortar dispense location by way of control signals by the robot controller 417.

In some embodiments of the present invention, a controlled counter-mass may also be incorporated into the work platform in an attempt to actively dampen some platform motions. This may be advantageous in situations where it is desirable to have maximum rate brick laying without the provision of any settling time for disturbance damping. A countermass may also be incorporated into the actuator. For example, a linear actuator that advances a brick in a given direction may be configured to also propel a similar mass in the opposite direction along a co-linear or nearby parallel axis, thereby minimizing the overall disturbance to the platform caused by actuator reaction forces.

Figure 4B:
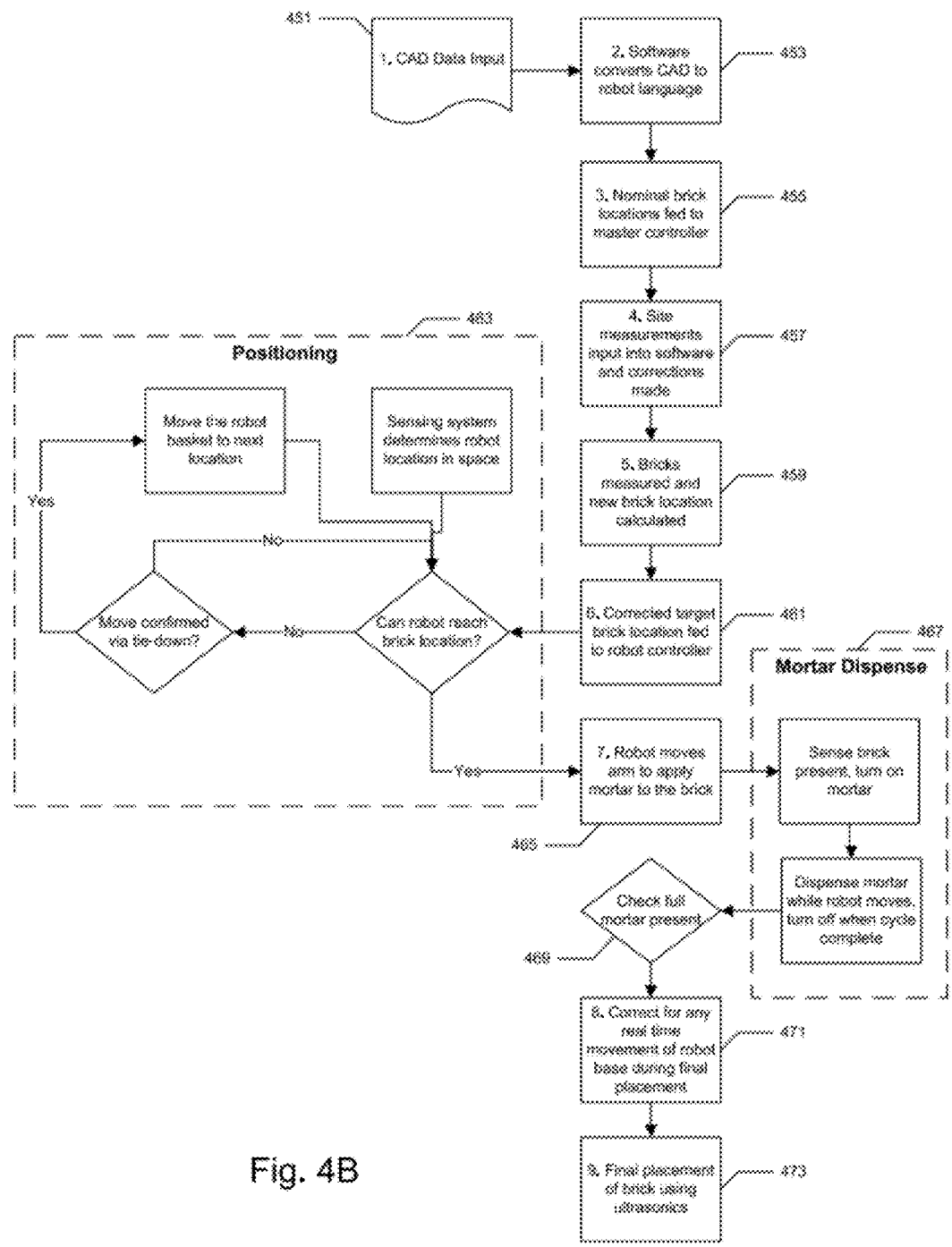
FIG. 4B depicts process flow for the brick laying system of the present invention.

FIG. 4B depicts process flow for the brick laying system of the present invention. A CAD file or files are input in step 451 where a software conversion of the CAD file or files into robot (machine) language takes place in step 453. Nominal brick locations are then fed to the master controller in step 455 and site measurements are input and corrections made in step 457. Bricks are then measured and new brick locations calculated in step 459 and the corrected brick locations are sent to the robot controller in step 461. The robot controller with guidance from the master controller then undertakes positioning 463 where a decision is made if the robot can reach the brick location. If not, the brick laying system undergoes a move that is confirmed via a tie-down, and the brick laying system is moved to the next location while the sensing system determines robot location in space. If it is determined that the robot can in fact reach the brick location, the robot moves the arm to apply mortar to the brick in step 465. Mortar dispensing 467 takes place where sensing of the presence of a brick takes place and then mortar is dispensed while the robot moves and mortar dispensing stops when the cycle is complete. Once mortar dispensing is complete in step 467, a check to ensure that there is a full mortar bed applied takes place in step 469 and corrections for any real time movement of the robotic components during final placement takes place in step 471, and then final placement of the brick occurs in step 473 where ultrasonics or other vibratory actuators are used to create low resistance to mortar flow and to set the brick and ensure a good bond between mortar and brick surface.

Figure 5A:
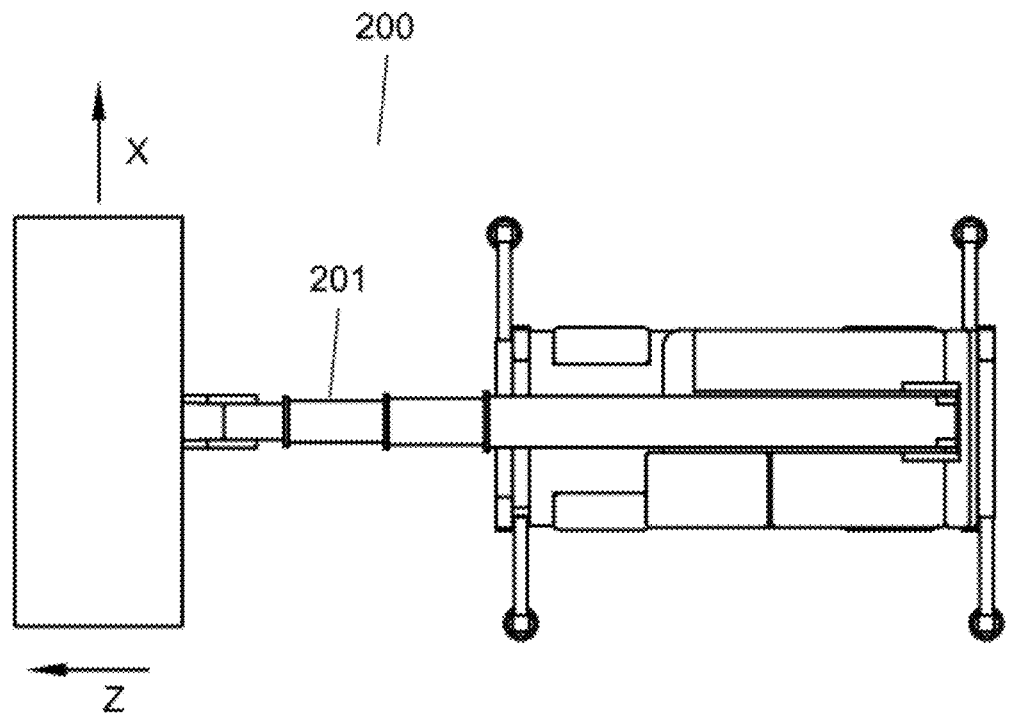
FIG. 5A and FIG. 5B depict axes definitions for the moveable platform.
Figure 5B:
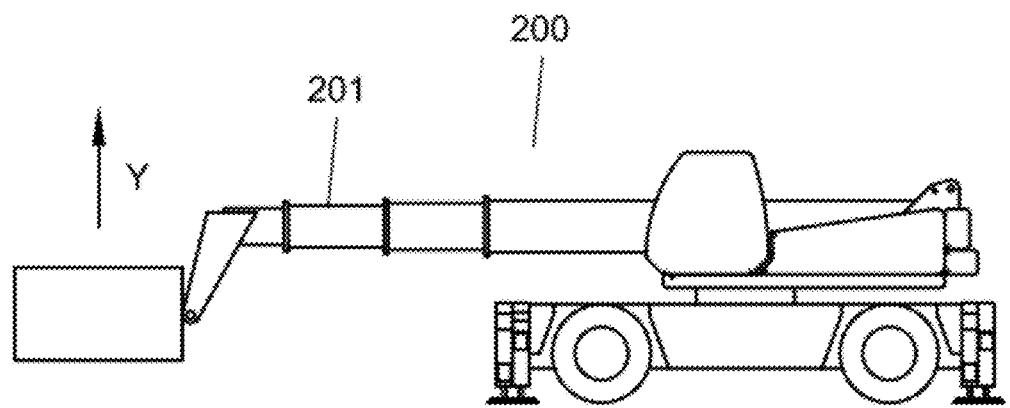

FIG. 5A depicts axes definitions for the moveable platform embodiment of the present invention. Other embodiments, such as a tracked cart arrangement containing the brick laying system, will also be described herein. FIGS. 5A and 5B show the platform operating using the Cartesian coordinate system rather than the polar coordinate system due to the limited range of motion of the present invention at any one time. The system of the present invention controls motion in multiple axes, and in some embodiments of the present invention, all six axis of motion.

The use of commercial rough terrain work platforms with the present invention to achieve jobsite positioning (and repositioning) greatly simplifies deployment; however, an extended work platform is expected to experience some disturbance caused by wind, the presence of a mason on the work platform, and reaction forces of the robot and other automation on the same platform. Variations in extension, combined with load variations as bricks and mortar are consumed and then replenished will further vary the response of the system. Both for safety and deployment simplicity, compensation for unavoidable platform motion in the robot may be preferred, rather than trying to apply active servo-hydraulic control directly to the platform. In some embodiments of the present invention, active control of a counter mass upon the platform to minimize disturbance magnitude or duration may also be used. In either case, it is very important to characterize platform motions that may be experienced under varied disturbances and loads to ensure compatibility with sensing and control.

Boom lift vehicles have been in use at construction sites and warehouses for decades now. However, despite this time, there is surprisingly little data available on their dynamics. While datasheets and brochures list maximum loads, extensions, power, and dimensions, there is often no mention of resonant frequencies or damping. Characterization of the basic dynamics of a work platform is thus required to ensure compatibility with the robotic arm assembly control software, sensing and correction functions As shown in FIGS. 5A and 5B, we have chosen to use the Cartesian coordinate system, rather than a polar coordinate system. This is because we are primarily concerned with motion of the platform in a very limited range, rather than across large boom rotations and extensions. Thus, our X-axis is defined as horizontal, side-to-side motion of the platform. The Y-axis describes vertical motion of the platform, and the Z-axis measures forward and reverse motion.

An example of a procedure to characterize the basic dynamics of a work platform that may be used with the present invention is described below with actual test data. The procedure and measurements may vary to suit the work platform, but remain within the spirit and broad scope of the present invention.

In order to acquire data in the most consistent and reproducible manner, we have performed four complete tests of the present invention with the lift vehicle in two separate positions. We began our testing in Position 1, with the boom rotated 90° from its resting position and outriggers deployed. The platform was initially elevated only twelve inches from the ground. After testing was performed, the platform was raised to a height of 28° and data was again collected. Once complete, the vehicle was driven forward twelve feet and the platform was rotated 135°, termed Position 2. Again, data was collected at 1 and 28' elevations.

Initial tests were performed with minimal added platform weight. Only a single human operator and necessary computer hardware were allowed on board. However, we also performed a low-elevation test with approximately 1700 pounds of additional weight, with results provided herein.

The dynamics of the lift platform were determined by analyzing plots obtained using 500 CPI (counts per inch) (2000 counts per inch effective) string encoders. Data was collected from three encoders at a sample rate of approximately 150 Hertz using a LABVIEW® virtual instrument. LABVIEW® is a registered trademark of National Instruments, Austin, Tex. The encoders themselves were attached to the work platform, as close to one another as possible. The strings were attached magnetically to fixed bases that rested on the ground or were rigidly attached to the side of the building. In choosing our attachment points, every effort was made to operate the encoders with their strings near full extension. This minimizes the amount of measurement error introduced by motion along other axes.

Figure 17:
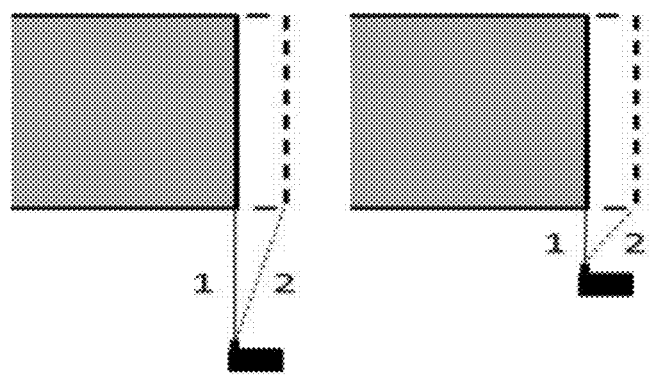
FIG. 17 depicts determination of string encoder extension error.

FIG. 17 depicts determination of string encoder extension error. In the configuration at left in FIG. 17, a small motion in the horizontal axis only slightly pulls the vertical axis string. In the left configuration of FIG. 17, $L_1=20"$, $\Delta x=7.0"$, Angle=19°, $L_2=20/\cos(19°)=21.2"$. Error=5.9%. However, in the right configuration in FIG. 17, a small motion in the horizontal axis draws a proportionally significant amount of string, thus introducing large error in the vertical axis. In the right configuration of FIG. 17, $L_1=10"$, $\Delta x=7.0"$, Angle=35°, $L_2=10/\cos(35°)=12.2"$, Error=22%. The error is given by:

$$\text{Error}=(\text{measured}-\text{actual})/(\text{actual})=(L_1/\cos(a\tan(\Delta x/L_1))-L_1)/L_1=\sqrt{(1+(\Delta x/L_1)^2)}-1$$

Thus, as the original distance $L_1$ between the encoder and the platform increases to infinity, off-axis displacement error goes to zero. Practically speaking, while we could have increased the length of the encoder strings, doing so would have then introduced cable sag error into the horizontal axes. Thus, our horizontal string encoders were simply operated close to their full 48" extension. However, when measuring the vertical motion of the platform at elevations greater than a few feet, we supplemented the encoder's 48" length with a section of thin steel cable (about 25' in length at our highest test point).

Figure 18:
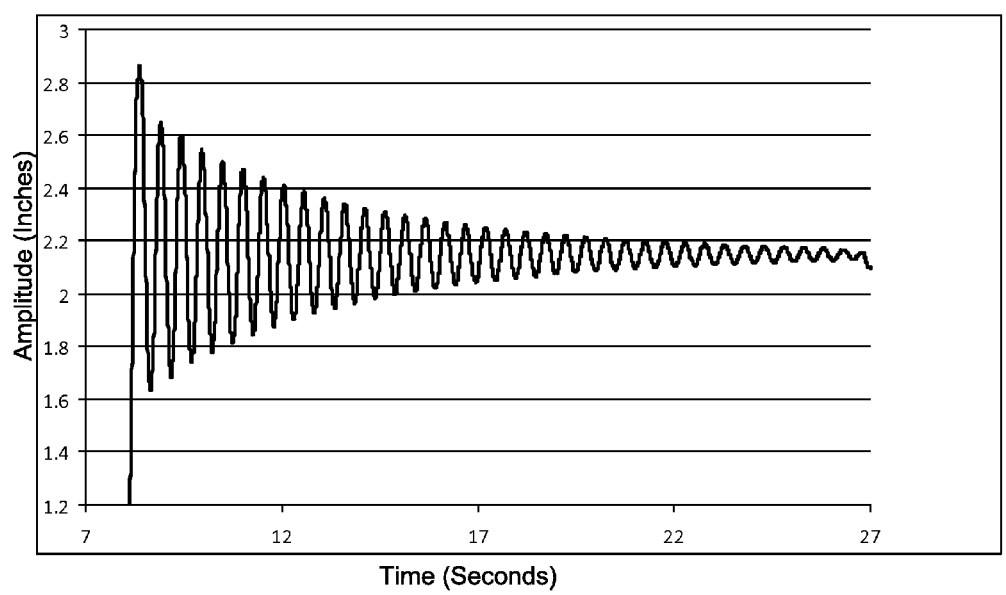
FIG. 18 is a plot of motion of the platform's Y-axis after commanding the boom to move vertically upwards.

In order to obtain data for the natural frequency of the platform, the system was first hydraulically actuated with what amounts to a step response using the basket positioning controls. FIG. 18 is a plot of the motion of the platform's Y-axis after commanding the boom to move vertically upwards. This response can be approximated as an exponentially decaying sinusoid with a frequency close to 2 Hz and very little damping. In fact, our results indicate that the platform's vertical axis was least damped in its motion and exhibited the largest positional amplitude. FIG. 18 shows a Hydraulically-Actuated "Step" Response, Y-axis, Platform Position: 1, Elevation: 1.0.

Figure 19:
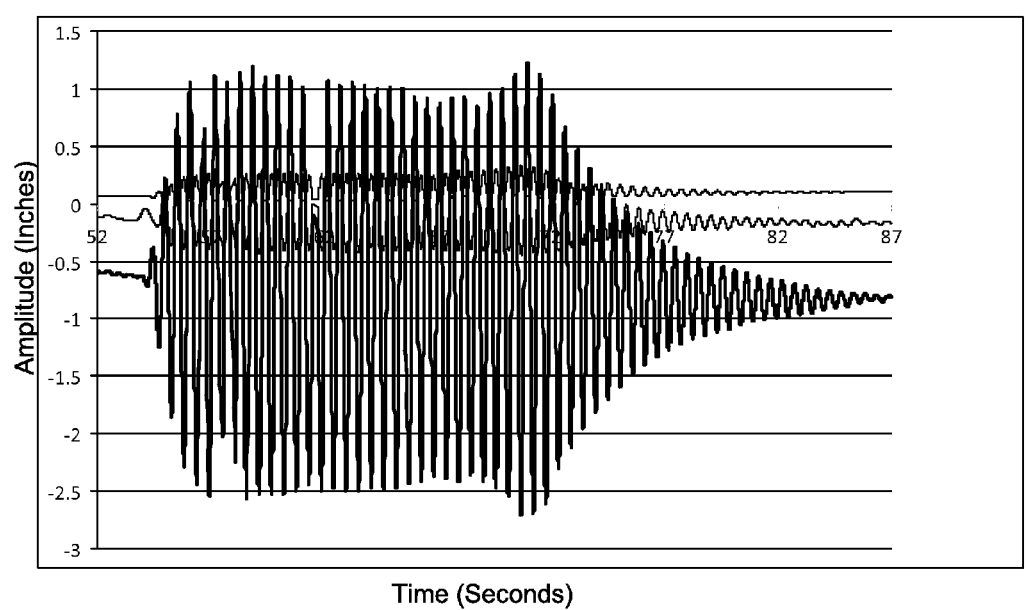
FIG. 19 is a plot of motion of the platform in response to human excitation.

In addition to our hydraulically-actuated response curves, we also measured the motion of the platform in response to human excitation. A single person standing on the platform held the guard rails, then moved in order to excite the platform at its resonant (natural) frequency. The results of such a test can be seen in the graph of FIG. 19, where the person on the platform moved only vertically up and down, thus primarily causing motion along the Y-axis. Actuation began at 54 seconds and concluded at 72 seconds. Human Actuation (highest amplitude=Y-axis, middle amplitude=X-axis, lowest amplitude –Z-axis), Position: 1, Elevation: 1.0'

Data collected for the platform's X-axis motion indicates very high damping in addition to backlash (discussed below). Hydraulically and human-actuated responses are shown by way of related figures.

Figure 20:
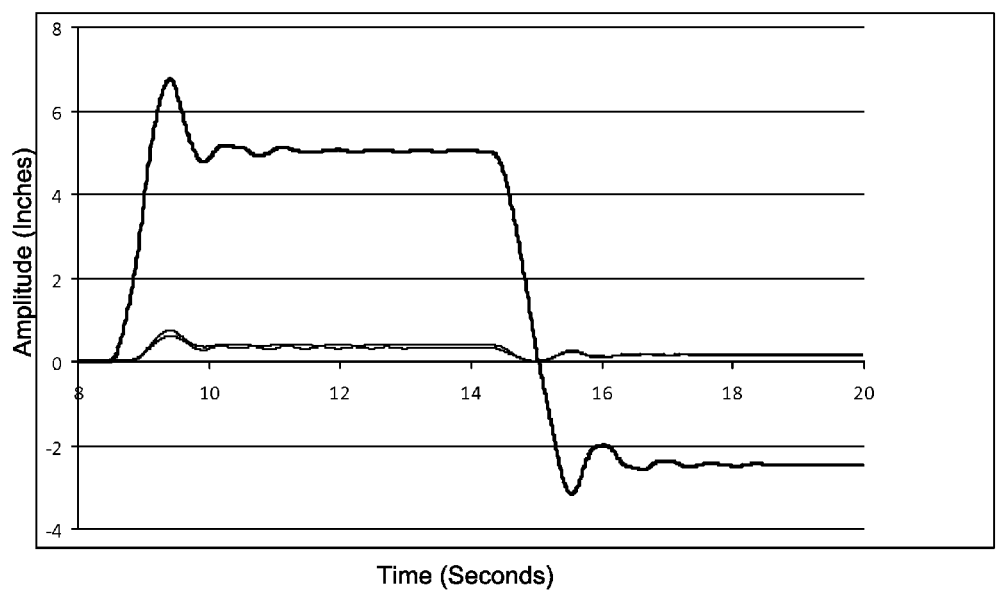
FIG. 20 is a graph depicting two hydraulically actuated step responses.

FIG. 20 depicts two hydraulically actuated step responses: Platform Position: 1. Elevation: 1.0'

Figure 21:
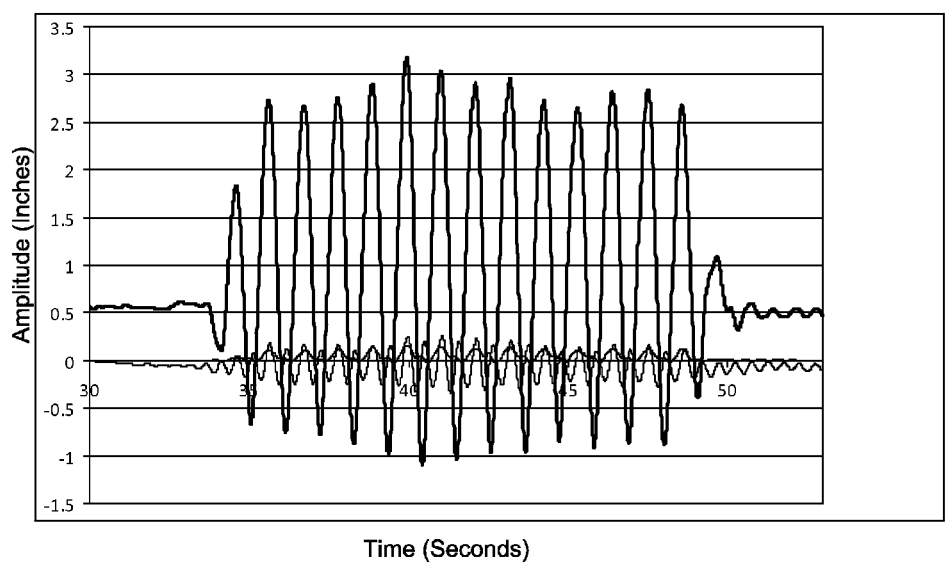
FIG. 21 depicts human actuation along the X axis.

FIG. 21 depicts human actuation along the X axis (Side-to-side motion).

Figure 22:
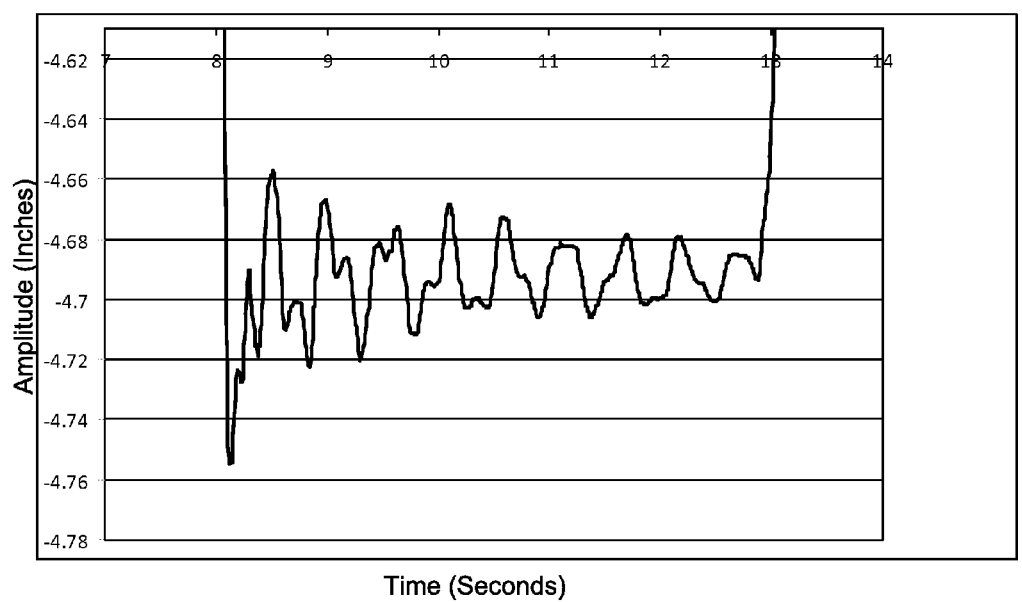
FIG. 22 shows a plot of Z-axis motion.

The platform Z-axis proved much more rigid. As mentioned above, most of the Z-axis frequency data presented above is dominated by off-axis cosine error. In other words, the platform moved so little along the Z-axis that motions along the other axes pulled the Z-axis encoder string enough to obscure the fine details of the platform's motion. FIG. 22 shows a plot of Z-axis motion (note the amplitude). Shown in FIG. 22 is a hydraulically actuated step response in the Z-Axis, Position: 1, Elevation: 1.0'

In addition to string encoders, we simultaneously performed measurements using a three-axis accelerometer. This device was rigidly attached to the work platform during testing, and stored data at a rate of 50 Hertz. In an ideal world, we should be able to twice integrate this acceleration data in order to obtain position. Unfortunately, real accelerometers are subject to noise and drift.

Figure 23:
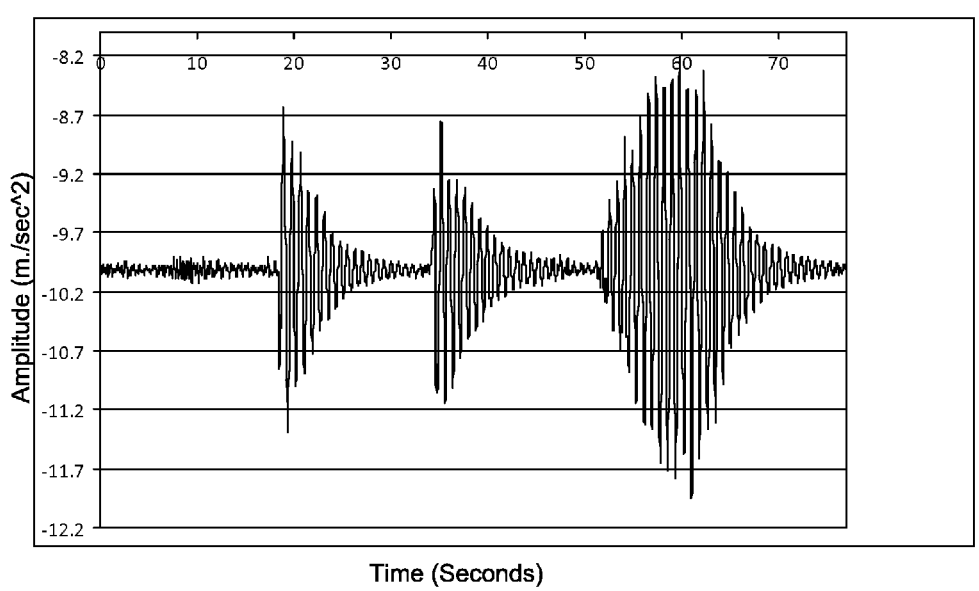
FIG. 23 shows accelerometer data, Z-Axis, two hydraulic actuations followed by human actuation.
Figure 24:
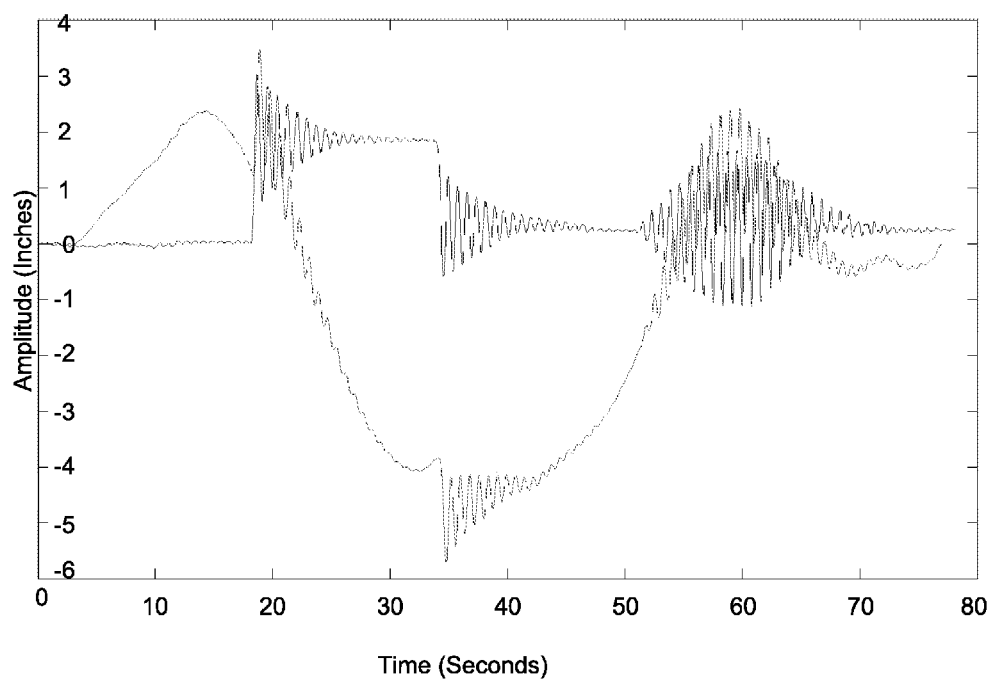
FIG. 24 depicts both accelerometer data twice integrated and actual position.

While the raw acceleration data didn't appear to contain much noise or drift, once integrated these effects became clear. FIG. 24 is a graph created by subtracting out the average value of acceleration, then integrating, then subtracting out a second average value of velocity, then integrating once more. Although the data seems to drill in a slightly sinusoidal nature, this drift does not seem to be consistent enough that it can be anticipated and removed. FIG. 24 depicts both accelerometer data twice integrated with the slight sinusoid variation and actual position depicted as a step function. The scale is inches. FIG. 23 shows accelerometer data, Z-Axis, two hydraulic actuations followed by human actuation.

Platform Data Summary

Parameters were determined for the equation:

$$P=P_0\exp(-Zt)\sin(2\pi f_a t)$$

Parameters marked in bold are maxima or minima for a specific axis parameter:

TABLE I

Platform Data Summary

| Conditions | | Natural Frequency (Hz) | Damping Ratio | Max Travel (in) |
|---|---|---|---|---|
| Additional Mass: | 200 lb | | | |
| Extension (Z): | 0.0' | $f_X=0.998$ | $Z_X=1.101$ | $A_X=4.200"$ |
| Elevation (Y): | 1.0' | $f_Y=1.950$ | $Z_Y=0.209$ | $A_Y=3.950"$ |
| Angle (from Z-axis): | 90° P1 | $f_Z=1.957*$ | $Z_Z=0.407*$ | $A_Z=0.095"$ |
| Additional Mass: | 200 lb | | | |
| Extension (Z): | 15' | $f_X=0.593$ | $Z_X=0.343$ | $A_X=5.150"$ |

TABLE I-continued

Platform Data Summary

| Conditions | | Natural Frequency (Hz) | Damping Ratio | Max Travel (in) |
|---|---|---|---|---|
| Elevation (Y): | 28' | $f_Y$ = 1.268 | $Z_Y$ = 0.261 | $A_Y$ = 2.770" |
| Angle (from Z-axis): | 90° P1 | $f_Z$ = 1.379 | $Z_Z$ = 0.3371 | $A_Z$ = 0.470" |
| Additional Mass: | 200 lb | | | |
| Extension (Z): | 17' | $f_X$ = 0.606 | $Z_X$ = 0.335 | $A_X$ = 5.320" |
| Elevation (Y): | 28' | $f_Y$ = 1.163 | $Z_Y$ = 0.370 | $A_Y$ = 3.580" |
| Angle (from Z-axis): | 135° P2 | $f_Z$ = N/A | $Z_Z$ = N/A | $A_Z$ = 2.300" |
| Additional Mass: | 200 lb | | | |
| Extension (Z): | 0.0' | $f_X$ = 0.952 | $Z_X$ = 0.707 | $A_X$ = 4.110" |
| Elevation (Y): | 1.0' | $f_Y$ = 1.646 | $Z_Y$ = 0.282 | $A_Y$ = 7.200" |
| Angle (from Z-axis): | 135° P2 | $f_Z$ = 1.111* | $Z_Z$ = 0.715* | $A_Z$ = 0.255" |
| Additional Mass: | 1700 lb | | | |
| Extension (Z): | 0.0' | $f_X$ = 0.655 | $Z_X$ = 0.459 | $A_X$ = 1.730" |
| Elevation (Y): | 1.0' | $f_Y$ = 1.120 | $Z_Y$ = 0.193 | $A_Y$ = 1.580" |
| Angle (from Z-axis): | 90° P1 | $f_Z$ = N/A | $Z_Z$ = N/A | $A_Z$ = N/A |

*Note:
Parameters for the Z-axis determined while the platform is at low elevation are dominated by motion along the Y-axis, and thus cannot be considered accurate.

Backlash Data

Figure 25:
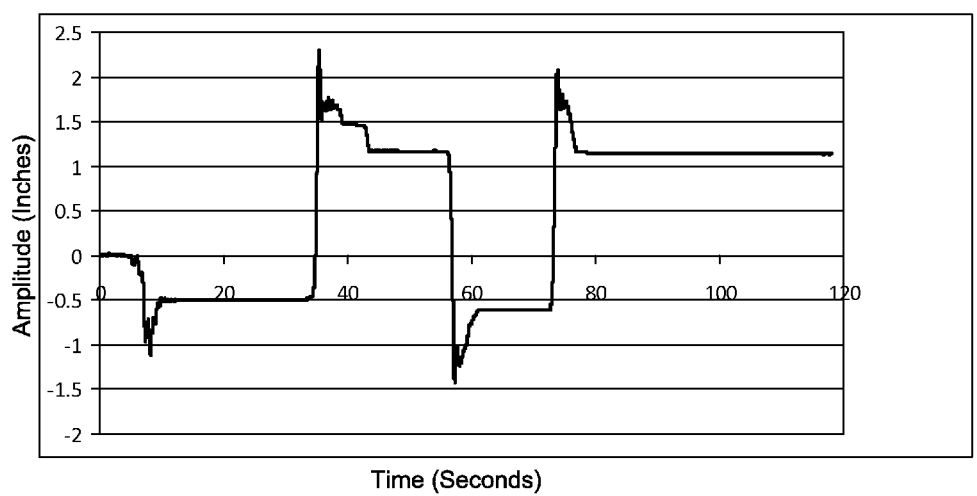
FIG. 25 shows data for two instances of backlash measurement.

During testing we noticed that the rotation of the boom (motion along the X-axis) involved a certain amount of backlash. In order to characterize this, we first manually pushed the platform in the negative X-direction. We then slowly released it and allowed it to return to a stable position. Finally, we manually pushed the platform in the positive X-direction, then slowly released it. Data for two instances of this backlash measurement test (X-Axis) is shown in FIG. 25, and calculations based on the boom extension are shown below.

Based on the above data, the maximum backlash angle with the boom fully retracted (r=255", angle from Z-axis=90°) is calculated by:

$$\alpha = (360)(1.75") / (2\pi r) = 0.393°$$

The maximum backlash angle with the boom fully extended (r=335", angle from Z-axis=45°):

$$\alpha = (360)(1.65") / (2\pi r) = 0.282°$$

Thus, the average backlash angle is 0.338°

Weight and Frequency Calculations

Comparing the ratio of the natural frequencies of the ballasted (1700 lb added mass) platform to the un-ballasted (200 lb) platform to the ratio of the gross weights indicates an inverse linear relationship between weight and frequency, as expected:

$$f_{XB}/f_{XUB} = (0.655/0.998) = 0.656 \text{ Average Ratio} = 0.615$$

$$f_{YB}/f_{YUB} = (1.120/1.950) = 0.574$$

$$W_{UB}/W_B = [(200+2200)/(1700+2200)] = 0.615$$

Thus, the frequency along all axes can be estimated by the following (where $W_A$ is added weight in lbs):

$$f_X = (-2.287E-4)W_A + 1.044 \text{ Hz}$$

$$f_Y = (-5.533E-4)W_A + 2.061 \text{ Hz}$$

$$f_Z = (-5.020E-4)W_A + 2.057 \text{ Hz}$$

Figure 6:
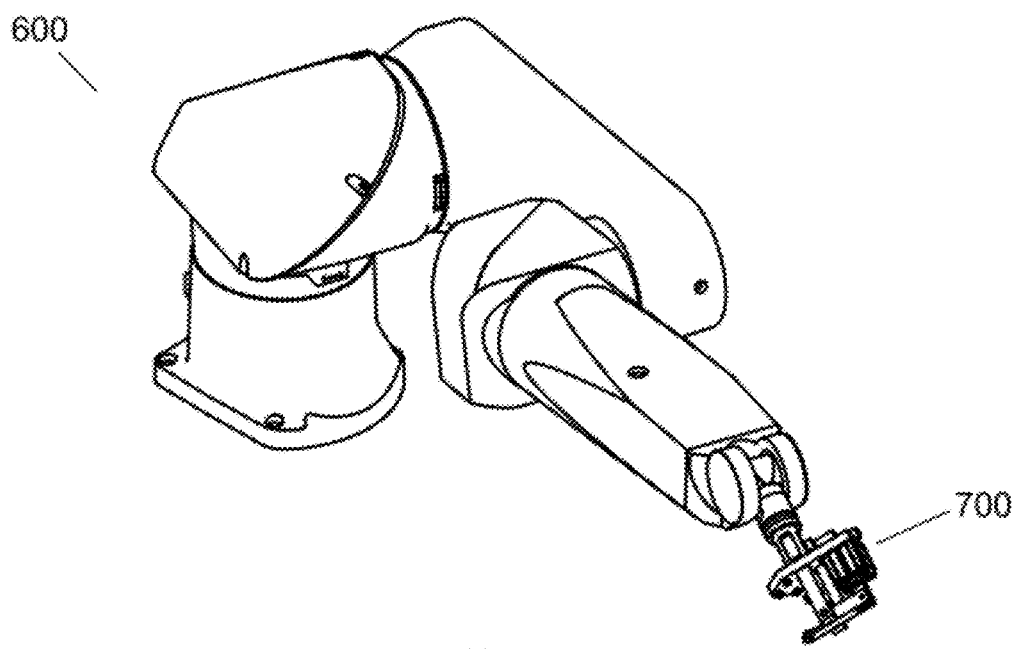
FIG. 6 depicts a robotic arm assembly of the present invention.

Turning now to FIG. 6, a robotic arm assembly of the present invention is depicted. Robots in manufacturing facilities routinely perform conveyor tracking such that products can be picked and placed on moving conveyors; however, the challenge of accepting a six degree of freedom (6DOF) disturbance suitable for compensating robot base motion has proven challenging or impossible for most commercial robotics companies.

In the future of manufacturing and construction, the need will arise for robots that operate in larger work envelopes than can be supported using traditional fixed-base industrial robot systems. Robots may instead be mounted to mobile equipment subject to disturbance. Such disturbance may be compensated using robot arm motions if sufficiently precise and rapid sensing and control systems are available.

A disturbance compensation system using a six axis industrial robot and controller, such as, for example, the Stäubli® TX90 is further described herein. Stäubli® is a registered trademark of Stäubli International AG Corporation of Pfaffikon. Switzerland. The industrial robot is coupled with a developmental six degree of freedom sensor package capable of high bandwidth, accurate sensing throughout the workspace. The robot is mounted to a moveable platform. Sensor measurements are then processed and fed into a controller such as, for example, the Stäubli® CS8C in order to successfully stabilize the end effector 700. Stäubli® is a registered trademark of Stäubli International AG Corporation of Pfaffikon. Switzerland.

The field of robotics is rapidly evolving. Industrial robots are being employed in almost every field imaginable—from semi-conductor fabrication to agriculture. Although many robots used for manufacturing are locked in place or mounted to precisely controlled platforms, some are being given a bit more autonomy. For example, imagine using a robot to paint or repair a bridge. You might try to mount the robot to the bridge itself, but that would involve installation of a complicated railing system as well as a position sensor of some kind. The quickest approach may in fact be to mount the robot to a boat, a solution which also makes the entire system portable. Then the problem becomes how to detect the position of the boat and/or the robot. And once you know their positions, how can the robot be programmed to compensate for the inevitable rocking motion of the boat?

Applications such as this have motivated the development of the novel disturbance compensation system presented herein. We have combined a custom-designed six degree of freedom (6-DOF) position and orientation sensor with an industrial six axis robot such as the Stäubli® TX90. Stäubli® is a registered trademark of Stäubli International AG Corporation of Pfaffikon. Switzerland. The TX90 was mounted to an aluminum structure not unlike a diving board, which was allowed to oscillate at a rate of about 2 Hz with amplitude of up to four inches. Sensor data was then utilized to stabilize the end effector despite large movements of the base. This was accomplished through use of the external alter function provided by the robot's controller.

While specific applications such as ours are rare, there are a number of examples of disturbance compensation which are worth exploring. For instance, the Rapidly Deployable Stable Platform (RDSP) utilizes adaptive disturbance rejection to allow ships to transfer cargo despite high waves. The system requires only pitch measurements to correct for choppy seas, allowing cargo to be transferred when conventional cranes can't operate for safety reasons. Another application is presented which illustrates disturbance compensation incorporated into a biped walking vehicle. The system is designed to maintain balance despite both static and dynamic disturbances. Sensing is accomplished by means of a 6-axis force/torque sensor placed in the passenger's seat. This data is then used to control the motion of the vehicle's legs.

The custom sensing system we've designed was developed specifically with robotic manufacturing, maintenance and construction in mind. In construction particularly, high positional accuracy over large (tens of meters) distances is very important. One potential application of this system is in tracking the position and orientation of construction vehicles.

Since boom lift vehicles such as the Manitou MRT-2540 are commonly used on construction sites, we investigated the dynamics of such a system. This was done in order to determine the required performance for an attached sensor. We were mainly interested in the dynamics of the lift platform rather than those of the vehicle, particularly since this platform might serve as a base for our bridge repair robot.

The data gathered for the Manitou lift indicate that platform oscillations will occur at a frequency of no more than 2 Hz with maximum amplitude of about four inches. This is about what one would expect intuitively, given the high mass of this device. With comparable weight and size, other lift vehicles should present similar dynamics.

With this information in mind, we first searched for a 6 Degree of Freedom sensor which could provide millimeter accuracy over an area measuring 15 m by 10 m. There were no cost effective systems available. For instance, although laser trackers would provide extremely high accuracy, they typically cost $100 k or more. Thus, we set about designing our own 6 Degree of Freedom sensor which would provide the necessary resolution but at lower cost. Our final prototype utilized lasers and high-speed scanning mirrors to measure four angles which were then used to compute position. Accelerometers acting as inclinometers were also used to supplement orientation data. We did achieve ±0.5 mm positional accuracy and ±0.05° rotational accuracy over an area measuring about 2 m by 3 m (larger areas were not fully tested but should yield comparable accuracy). This resolution was accomplished at a sampling rate of 1671 Hz.

The Stäubli® TX90 is a sophisticated industrial robot which can rapidly move a 20 kilogram payload within its 1 meter reach. Stäubli® is a registered trademark of Stäubli International AG Corporation of Pfaffikon, Switzerland. It also demonstrates positional repeatability of 0.03 millimeters. The controller utilized in this test was the Stäubli® CS8C. Stäubli® is a registered trademark of Stäubli International AG Corporation of Pfaffikon, Switzerland.

To demonstrate disturbance compensation, the TX90 was fixed to a moveable platform. This platform is essentially a large cantilever beam. It is pinned at one end but is still free to rotate around a single axis. Directly beneath the robot a large spring was mounted. The entire system was designed and simulated within SolidWorks 2008 using COSMOSMotion before being built. A lever extends from the end of the platform that allows for manual platform actuation.

The parameters of the system described here were chosen such that the platform oscillated at a natural frequency of about 2 Hertz with amplitude of up to four inches. It was thus designed to closely mimic the dynamics of the work platform attached to the Manitou MRT-2540 lift vehicle described previously.

In addition to the input lever shown above, a motor with an attached off-center weight was fastened to the platform next to the robot. The motor was controlled by a Kollmorgen drive and could be tuned to the precise speed necessary to send the platform into resonance. This speed was determined to be about 110 Rotations per Minute (RPM), although it varied by a few RPM depending on the configuration of the robotic arm due to its changing center of gravity. This speed indicates a resonant frequency of about 1.8 Hertz, just slightly beneath our 2 Hertz design target.

With the platform constructed, the sensor assembly was rigidly mounted next to the robotic arm. Whenever the platform was moved, the sensors would move in sync with the robot. To compensate for platform disturbances, the data received from the sensors was processed and sent to the external alter function provided by the Stäubli® CS8C controller. Stäubli® is a registered trademark of Stäubli International AG Corporation of Pfaffikon, Switzerland. This function applies real-time changes to the trajectory of the robot at a rate of 250 Hertz. For example, if the robot is commanded to move linearly between two points, with no external alter applied, the end effector will follow a straight line through space. If the same motion is executed while applying a sine wave alteration along the z-axis, the end effector will appear to trace out a sine wave between its starting and stopping points.

By using the alter function we can keep the end effector in any desired position, or trace any desired path. This is useful in compensating for the motion of the base. In theory, this task is as simple as sending the negative of the sensor readings to the controller. In other words, if the sensors register a positive z-axis motion of 5 millimeters, the alter function should apply a negative z-axis change of 5 millimeters. The same thing applies for all six axes: x, y, z, roll, pitch, and yaw. In practice, however, this method of disturbance compensation is complicated by communication lag and delays in the CS8C controller itself.

To process data from our sensors during testing, we utilized National instruments' LabViEWU 2009. LABVIEW® is a registered trademark of National Instruments. Austin, Tex. A virtual instrument (VI) was designed to perform the necessary orientation calculations and transmit the results to the CS8C controller over a 100 Mbps dedicated Ethernet connection.

In our first test, the robot was simply programmed to apply the alter values while holding a single position in space. During initial trails we observed that compensation only worked when the cantilever platform was held by the input lever and slowly moved by hand. However, we observed the end effector vibrating slightly at high frequencies. Furthermore, when the platform was disturbed and allowed to oscillate freely, the motion of the robot actually caused the oscillations to increase in amplitude over time. In fact, if allowed to continue, the oscillations grew so large that the TX90 actually shut down due to over-speed errors.

After careful examination of the system, two problems were uncovered. First, the unfiltered sensor data actually detected the small, high-frequency oscillations caused by the motion of the servos within the TX90. These small movements were then applied to the motion of the arm via the alter function. This caused the end effector to vibrate even further, which led to greater sensor vibration, etc. The solution to this problem was to apply a low pass filter to the raw sensor data. Unfortunately, the phase lag associated with low pass filtering actually compounded our second problem. There existed a lag of about 80 milliseconds between when the sensor readings were sent to the controller and when they were actually applied to the motion of the arm. This was discovered by sending the controller a simulated sine wave signal and measuring the response of the arm using a USB string encoder which returned data at 250 Hertz with a resolution of 0.5 mil. Results of this test being previously described. This 80 ms delay leads to a 58° phase shift in this 2 Hertz sine wave. Other sine wave frequencies were tested, from 0.5 Hertz to 3 Hertz. Each of these tests showed a different degree of phase shift, but the 80 millisecond delay remained about constant.

In the case of our approximately 2 Hertz platform oscillation, 58° of phase shift is significant enough to cause instability. Think of a child on a playground swing. If he moves his legs in opposition to the oscillation of his swing, he will quickly come to rest. However, by moving his legs in phase with the oscillation of the swing, he can increase the height of his swinging. This is precisely what happened in our test. The robot, instead of moving in sync with the platform, lagged behind the platform's motion, causing a phase shift which amplified the system's oscillations.

We were later able to reduce the lag observed during sinusoidal testing to approximately 60 milliseconds. This was accomplished by adjusting the frequency of an internal boxcar filter. The purpose of this filter is to smooth the motion of the arm and prevent instability. However, it comes at the cost of significant delay (which in most applications is no issue). Unfortunately, 60 milliseconds was still too much lag for a stable response, resulting in about 43° of phase shift. Further reduction of the boxcar filtering was not possible, as it resulted in large unstable vibrations at the end effector.

One additional test was performed to further characterize this lag. Rather than look at the steady-state sinusoidal response, a program was written to examine the system's step response. In this test, alter was not utilized. An application was created which simply waited to receive a "go" command over Ethernet. Once that command was received, the robot would begin moving in a predefined path. A string encoder was once more attached to the end effector. The encoder was then monitored as the move command was sent. The boxcar filter frequency was set to 15 Hertz. With this simple test, the delay was still approximately 40 milliseconds.

In general, such lags are not uncommon, and may arise from sensors, control processing, or actuators. In dealing with vehicle active suspension for example, a 50 millisecond actuator delay may be typical. Fortunately, the rate of oscillation of our cantilever platform is consistently about 2 Hertz regardless of arm position and payload. With this in mind, we combined our low pass Butterworth filter of 2 Hertz cutoff frequency in series with a phase-advancing $2^{nd}$ order filter. The filter is a weighted sum of the second derivative of the sensor measurement and the measurement itself.

$$y(t) = \alpha \frac{d^2 x(t)}{d t^2} + \beta x(t) \tag{1}$$

The parameters α and β in the equation above were tuned experimentally to 0.013 and 1 respectively. This combination did yield the desired 60 millisecond prediction, which was enough to overcome the controller delay.

Unfortunately, this method of filtering does not handle transients well, and tends to overcompensate for sudden disturbances. Furthermore, there is really no good way to handle transients while the 60 millisecond lag exists. For now, transients are only an occasional problem. In fact, transient motion in the Manitou lift platform described earlier is only experienced during hydraulic actuation since the mass of the platform is so great. During these movements the robot does not typically need to be in operation.

With predictive filtering in place, the first test was again attempted. The end effector was commanded to remain in position while the base was disturbed. In steady-state, the response was quite good. The end effector only appeared to move by a couple millimeters while the base was disturbed at amplitude of about 50 millimeters. To illustrate these results, several long-exposure photographs were captured. Each photo was taken with the same exposure and focus settings; the shutter was held open for ten seconds. These photos were not sharpened or altered in any way; they were only composited and titled.

For our final test, we programmed the robot to trace out a house-shaped path in space along the Y-Z, plane. To complete this motion the end effector had to move through a linear distance of about 70 centimeters. To illustrate the difference in path produced with and without disturbance compensation, a marker was placed in the end effector and was pressed against a whiteboard. A red line was first drawn without disturbance compensation while the platform oscillated with amplitude of about 30 millimeters. The program was then paused and the red marker was replaced with a black marker. The program was then started while disturbance was present and compensation was slowly enabled. This produced a squiggly black line which then transitioned into a fairly smooth, straight line.

The whiteboard test provides yet another illustration of the success of our disturbance compensation technique. Without disturbance compensation, the end effector moved wildly with significant amplitude. Once compensation was enabled, the end effector moved in straight lines with a deviation of less than 5 millimeters worst case.

Figure 7:
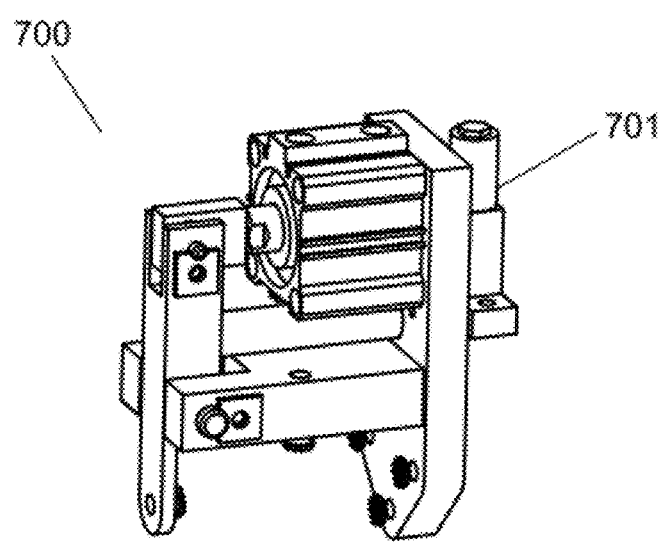
FIG. 7 is a brick end effector for the robotic arm assembly.

The end effector and mortar applicator are complimentary elements that may take several different embodiments. FIG. 7 depicts a brick end effector for the robotic arm assembly. Of particular note is the vibrator 701 that is mechanically coupled to the end effector and provides the necessary mechanical oscillations for bedding a brick or construction element into mortar and creating proper adhesion between the brick or building element, mortar, and adjacent brick or building element.

An end effector may be a rigid end effector, or may be a compliant end effector. In some embodiments, a compliant end effector docks or grips the wall or structure being built. Another example of a compliant end effector is disclosed in U.S. Pat. No. 4,919,586 to Derby and entitled Mechanical Closed Loop Robotic Arm End Effector Positioning System, the entire disclosure of which is incorporated herein by reference.

The end-effector is capable of gripping and holding bricks with small amounts of variation, including a rough surface to grip against, in one embodiment of the present invention, a 6 point datum structure is used. This datum structure allows one to touch the brick in multiple locations which reduces the point to point variation seen on brick surfaces. In some embodiments of the present invention, some of the points were complimentary to allow for variation in the brick so that it settles in the same location every time.

Other design features of the end-effector include a safety spring that holds the brick in place in the event of a system failure. This is important since the robot arm could be in any position when power is lost and the brick could fall a long distance if not locked in place. In one embodiment of the present invention, the end effector is operated using air actuation by providing compressed air to the end of the robot arm.

Figure 8:
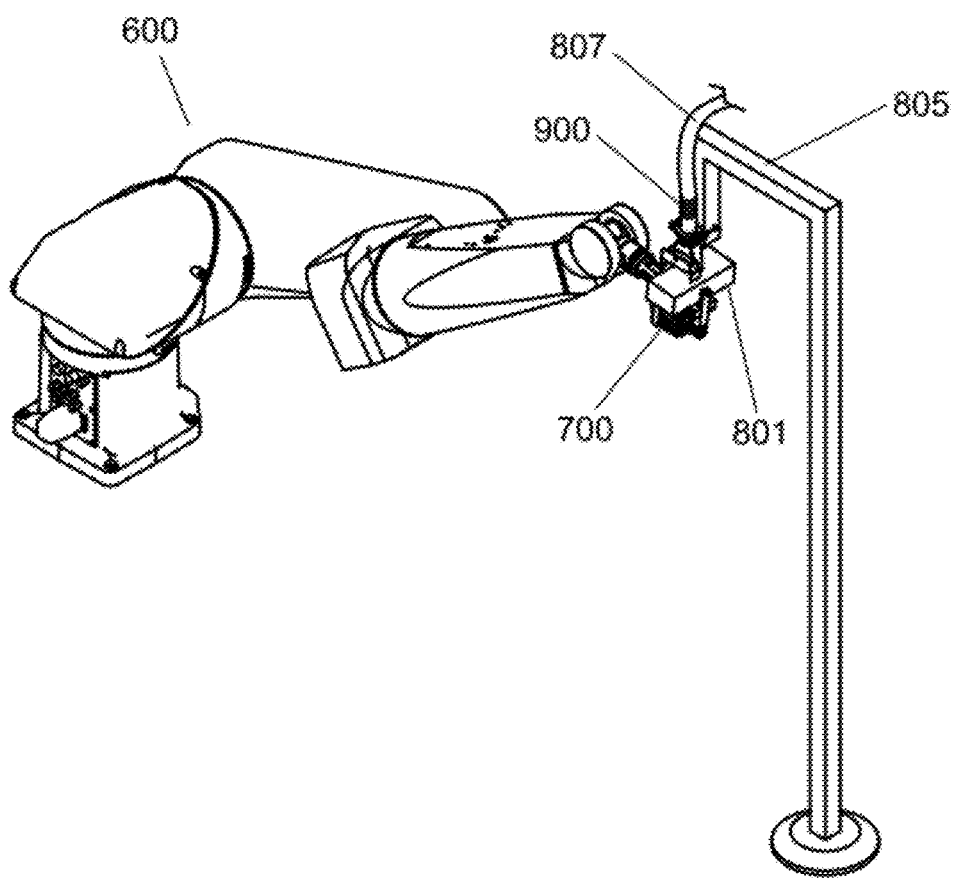
FIG. 8 is a perspective view of an exemplary robotic arm assembly with end effector.

FIG. 8 is a perspective view of an exemplary robotic arm assembly 600 with end effector 700. In some embodiments of the present invention, during placement of the brick with mortar, a vibrator 701 (not depicted in FIG. 8, see FIG. 7) such as an off centered rotational mass, piezoelectric device, or the like, may be used to vibrate the brick 801 in place or provide some equivalent to the current mason tapping method. This improves the adhesion of the mortar bed to the brick it is being laid on, and also improves the flow characteristics of the mortar in use.

Figure 9:
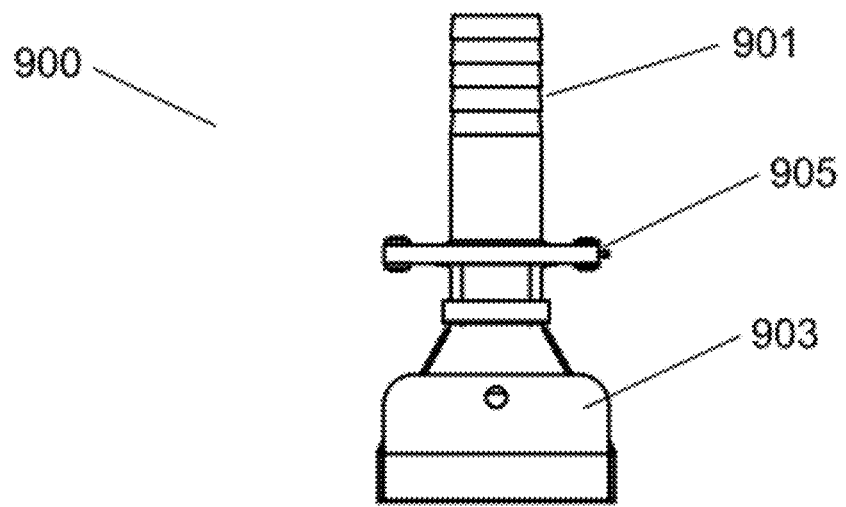
FIG. 9 is a perspective view of a mortar applicator.
Figure 10:
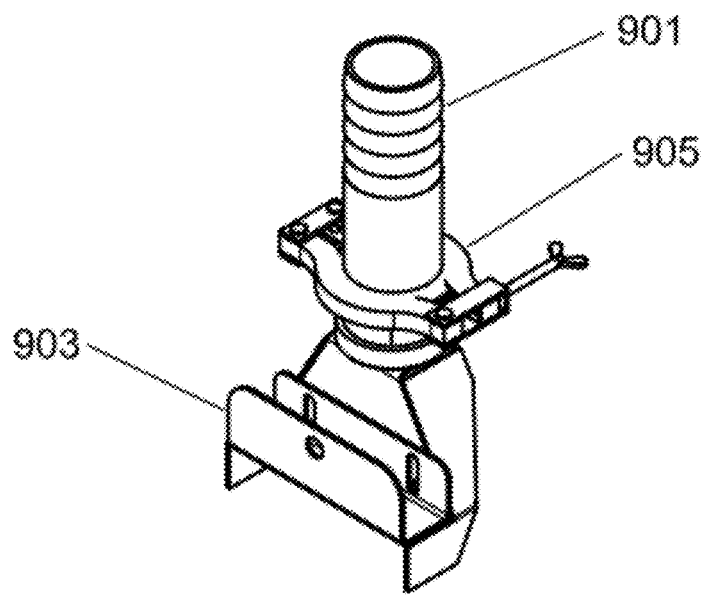
FIG. 10 is an alternate view of a mortar applicator.

The mortar nozzle 900 is very important to getting the mortar onto the brick since the brick will be manipulated after the mortar is applied and high adhesion of the mortar to the brick is critical. The mortar nozzle 900 must handle the high flow of mortar over a short period of time and control both the thickness of the bed of mortar as well as have good control over the sides of the mortar bed to prevent mortar from spilling onto the sides of the brick. The mortar nozzle 900 is connected to a mortar dispenser line 807 that provides mortar from a mortar transfer device (see FIG. 2, 211). The mortar nozzle 900 is held in place by a support such as the support 805 depicted in FIG. 8. Other supports may also be used. The robotic arm assembly 600 moves the brick 801 by the mortar nozzle 900 for application of mortar to the surface of the brick 801. In some embodiments, the mortar nozzle 60 moves by the surface of the brick 801 to dispense and apply mortar to the brick 801. The mortar nozzle 900 in use should also be cleaned and maintained after every use. FIG. 9 is a perspective view of a mortar nozzle 900, and FIG. 10 is an alternate view of a mortar nozzle. As seen in FIGS. 9 and 10, a mortar dispenser line fitting 901 provides a connection to a mortar dispenser line (see FIG. 2, 223) which is in turn coupled to a mortar transfer device (see FIG. 1, 115). A release flange 905 may be provided to ensure easy disassembly and cleaning, and a bedding tool 903 is depicted that is mechanically coupled to the mortar nozzle delivery end, and both guides the mortar nozzle 900 along the brick building elements and also may serve to smooth the mortar as it is applied. The nozzle may have a sanitary fitting such as the release flange 905 for easy cleaning after operation. This is important to reduce the amount of time it takes to clean the equipment during breaks and at the end of every shift. The sanitary fitting also allows flexibility to use alternative nozzles for other brick configurations.

The nozzle may also have a 1¼" diameter inlet with a tapered transition to the mortar bed width, or a comparable topology. This larger inlet to the nozzle prevents restriction in the pump hose that can cause high and unnecessary head pressures. Other techniques to reduce these high pressures include a return line and a gate valve topology, pressure relief functionality, and the like.

In some embodiments of the present invention, the nozzle has an adjustable shutter to vary the mortar thickness from 0.125" to 0.625". The shutter can be replaced with alternate shapes to create custom mortar bed shapes. Traditional masons use a variety of mortar bed shapes when applying mortar to a brick. Those shapes can vary from a v groove down the middle to a trapezoid shape or even a pyramid shape.

In some embodiments of the present invention, the nozzle has an optional addition of a vibrator to imbed the mortar more deeply to the brick surface.

In order to pump the mortar to the nozzle, various pumps may be used. In the current construction industry, it is very common for concrete or grout to be pumped, but mortar is pumped in very few instances since there are few applications requiring it. Grout is pumped in many instances and in many ways, from a hand-pump like the one produced by Chem-Grout, to a more complex auger technology for larger construction jobs. For example. Stone Construction Equipment's Groutzilla Placement System, which is held from a telehandler or forklift for grout delivery into masonry block walls.

Concrete is also pumped using several different technologies. A boom truck is a heavy-duty tow truck equipped with a boom lift, also known as a cherry picker, which is usually equipped with hydraulic piston pumping equipment. These systems can pump upwards or outwards at a range of 16 to 200 feet. Boom trucks are commonly used for large-scale concrete construction projects. Another pumping technology used for concrete is a line or stationary pump, which are used for concrete as well as for other construction materials. A line pump uses a piston technology that uses high pressure hydraulic alternating pistons to move the concrete long distances at high pressures. Another type of pump is the separate placing boom, which is essentially a boom lift removable from a boom truck. These also use a hydraulic piston pumping technology like that of the boom trucks. If the boom truck cannot be used or cannot be placed closed to the site, the boom can be removed and with an appropriate concrete pump can continually be used at the site without the truck. Schwing America, Inc. produces all three of these types of pumps, as well as Putzmeister America. Inc. and Reed Concrete Pumping & Gunite Machines.

Machine Technologies is currently one of the few companies that is currently pumping mortar. Their P-25 and MP-25 mortar pumps are commonly used to spray repair mortar. Both of these pumps use a progressive cavity technology and can pump at a rate of up to 12 gallons per minute. They can also pump a horizontal distance of 100 feet, and a vertical distance up to 60 feet.

In order to achieve the requirements desired, three different pumping technologies have been explored: a peristaltic pump, a positive piston hand pump, and a progressive cavity technology. Each one has been trialed to determine if the technology would be suitable for the application of the present invention.

A peristaltic pump was trialed. A Watson Marlow-Bredel SPX 32 was used. This is a rotary peristaltic pump which uses positive displacement to move material. The material enters the pump through a rubber tube, which may be circular or arched in shape. A rotor fitted with "rollers" roll over the rubber tube, compressing it and pushing the material through the pump, and out an exit nozzle. It is based on the function of the gastrointestinal track of the human body. This pump was originally chosen as it is known to handle high viscosity fluids and produce accurate outputs, although pulses caused from the rollers are a known issue with peristaltic pumps.

While usually used for smaller jobs or operations, a grout hand pump, such as the Handy-Grout HG9 was also tested. This is a hand-operated positive piston pump.

This pump has a maximum production output of approximately 1.87 gallons/minute, and the hopper can hold 5 gallons of material. This product was tested due to the similar nature of grout and mortar to see if mortar could be pumped using a simple piston technology.

A progressive cavity pump was the third, and most successful technology tested. The rotor in the pump is helical or corkscrew in shape and in its rotations essentially "rolls around" inside the stator which is lined with a rubber material shaped to the contours of the rotor. This produces a series of fixed cavities through which the material in the pump is delivered.

This type of pump is practical for highly viscous materials because it reduces the amount of shearing on the fluid. The volumetric flow rate of the pump is proportional to the rotation rate of the rotor, so this would easily allow for the desired rate of mortar to be delivered for our application.

Among the pumping technologies tested there are many differences. While all the technologies use some form of a displacement method, the peristaltic and progressive cavity technologies employ rotors to push the material, while the hand pump employs a piston technology.

In some embodiments of the present invention, an admixture may be added to the mortar mix to improve pumping characteristics. Admixtures are commonly used in concrete to enhance a wide variety of properties of the concrete. This would effectively create a less viscous mix with the same amount of water. Plastiment NS and Plastocrete 161 produced by the Sika Corporation are listed to reduce the amount of water needed in the mixture by 10%. Euclid Chemical Company produces a wide variety of water-reducing admixtures. Their Mid-Range Eucon X-15 can reduce water from 8-15% of the usual need. BASF also produces a number of water-reducing admixtures. The Pozzolith. Rheobuild, and Glenium are all brands by BASF that may be useful. The Glenium 3030 NS admixture can reportedly reduce water by 25-30%. A product like this could very well allow for mortar pumping and deliver in the desired water content range assuming comparable fluid viscosities.

Figure 11:
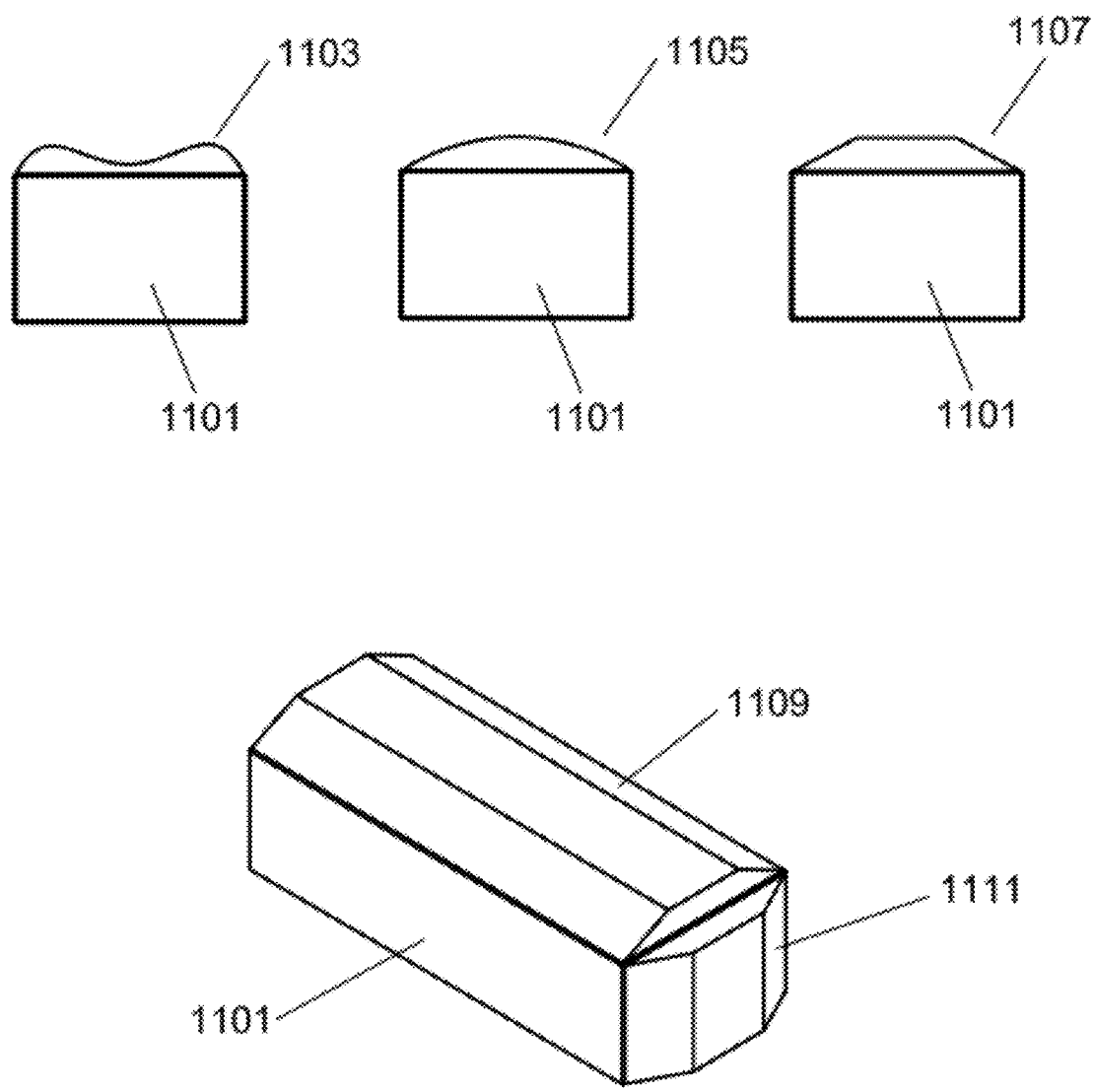
FIG. 11 depicts several alternative mortar bed designs.

In researching the common methods and practices of masons and the masonry industry, it was discovered that the application of a flat uniform bed of mortar on the brick was actually somewhat undesirable. The common practice when applying mortar to the brick would be to deliver rows of mortar to the brick, allowing for the mortar to push itself towards the middle as well as to the edges. FIG. 11 depicts several alternative mortar bed designs that may be used with the robotically assisted brick laying system. A brick or construction element 1101 is depicted with a mortar bed of varying geometries and placements. 1103, 1105, 1107, 1109 and 1111 are examples of different mortar bed geometries and placements. Others may be adopted for use with the brick laying system of the present invention.

Laser-based ranging and position sensing methods have become common in the construction field. In the present invention, work platform disturbance and motion will occur in all six degrees of freedom (x, y, z, pitch, roll, and yaw) and all six must be known for the platform which is continuously varying. In order to use this data to compensate for robot position, they must be updated at a sufficiently fast rate such that the robot control can accurately adjust its position based on the work platform disturbance. A novel laser-based system is described herein. In some embodiments of the present invention, a combination of sensing modalities, such as laser ranging and the use of inclinometers may be used.

High-precision positional and angular measurements are important for a variety of tasks, including navigation, automation, and surveying. Such measurements are often obtained by measuring angles between fixed and moveable points. These angles can then be used to calculate the Cartesian coordinates of an object using simple trigonometric formulae. However, as the distance from the measured object increases, the required angular resolution of the measurement device must substantially increase to provide the same positional resolution.

In one embodiment of the present invention, the laser-based measurement system of the present invention is capable of resolving angular changes as small as 0.0005° (0.5 millidegrees). Two sets of two angular measurements are made and used to compute the x and y coordinates of two moveable sensors. Based on this angular resolution, with laser measurement beacons spaced 15 meters apart covering a 15 meter square area, the x-y position of each sensor can be determined with an accuracy of ±0.5 millimeters. These two sets of coordinates can then be used to determine the rotation of the sensors with respect to the measurement points.

Each sensor is also capable of determining the location of an intercepting laser beam along its z-axis, with an accuracy of ±0.3 millimeters. This data, coupled with two accelerometers which sense angles with respect to gravity, we can completely sense motion in all six degrees of freedom (x, y, z, pitch, roll, and yaw) of our sensor pair.

In surveying and construction, the theodolite is commonly used to make highly-accurate angular measurements, which are then used to determine an object's position. This device is essentially a telescope mounted on two axes. By aligning the telescope with the object to be measured, the user can then read the desired angles from both axes. The resolution of these measurements is typically on the order of arc seconds. However, while these systems are typically very accurate, they are not normally designed to track and measure the angles to a moving target.

A similar angular measurement system has also been presented in U.S. Pat. No. 5,208,647: "Method and Apparatus for the Optical Measurement of an Angle Between Positions of Components Relative to Each Other", the entire disclosure of which is incorporated herein by reference. This system uses two lasers and a rotating mirror to determine the angle between two objects. It computes this angle based on the time between detection of the first and second laser beams. However, this system is designed for measuring angles over shorter distances, such as between the wheels on a vehicle. In light of these limitations we have designed a system which can automatically and continuously measure the angles between fixed points and moving objects with very high precision, further providing the ability of measuring both the position and orientation of an object in all of its six degrees of freedom.

One system of the present invention comprises two scanning laser assemblies and a pair of photodiode sensor arrays mounted to a 4-axis robot. Each scanning laser assembly includes a six-sided rotating mirror, a fixed laser, and two fixed photodiodes. The mirror and motor assemblies may be, for example, those used in a laser printer. These modules are digitally controlled and hard-wired to maintain a 0.02% stable rotational velocity of 10,000 RPM. The laser diode has a wavelength of 635 nanometers with an output power of 5 milliwatts. The photodiodes utilized to detect the beam are PIN-type, model BPW34.

As the mirror turns, the laser beam is swept through 120° per side, yielding six sweeps per motor revolution. For each side of the mirror, the beam will strike the two fixed photo detectors as well as the moveable photodiode detector board. As the laser strikes each photodiode, a voltage signal is generated, filtered, and then compared to a pre-set voltage to generate a digital "ON" or "OFF" signal. In one embodiment of the present invention, the time between these digital signals is monitored by an 18.432 Megahertz counter on an Atmel ATMega324P microcontroller. Timing data is communicated to a host PC at a rate of 167 Hertz over a standard RS-232 serial interface. The computer is responsible for computing angles and positions based on timing results.

Over one cycle we can compute the angle between our fixed and moveable detectors using the known angle and measured time between the two fixed photodiodes. The angle between the fixed and moveable photo detectors is then given by:

$$\theta = \frac{(k)(T_{fixed})}{T_{moveable}} \qquad \text{Equation 1}$$

In this equation, k is the constant angular distance between the fixed detectors, $T_{fixed}$ is the time between laser strikes on the first and last fixed photodiodes, and $T_{moveble}$ is the time between when the laser strikes the first fixed photodiode and the moveable photodiode.

Figure 26:
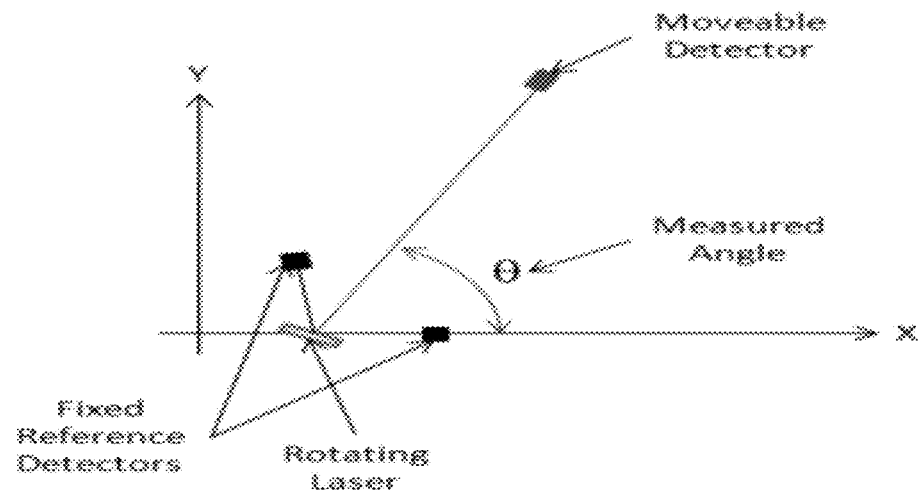
FIG. 26 depicts an exemplary angular measurement configuration.

FIG. 26 depicts an exemplary Angular Measurement Configuration. The precision of such an angular measurement is controlled by two factors: the resolution of the microcontroller's counter and the precision of the velocity measurement. At 18.432 Megahertz, the high-speed counter's resolution is ±54.3 nanoseconds. Assuming the motor maintains a constant rotational velocity of 10,000 RPM, the laser will be reflected at a rate of 120.000 degrees/second. This leads to an angular resolution of ±0.00651°.

While high counter frequency is relatively easy to achieve, keeping the motor moving at a constant rotational velocity is somewhat more difficult. However, to make up for variations in speed, the system measures an average angular velocity over approximately one sixth of a complete rotation. Of course, since the speed of the motor cannot be held perfectly constant, this value will inevitably be slightly different than the average velocity seen during, the actual measurement interval. This difference in velocity leads to slight variation in the angular measurement.

In one embodiment of the present invention, an optical encoder was added to the motor to allow velocity measurements over an angle that was much closer to the angle being measured. This was accomplished by counting the encoder pulses seen between the time the laser passed the fixed photo detector and the time it passed the moveable detector. Based on the time between the first and last encoder pulse and the encoder's stated counts per revolution, an average angular velocity was computed.

In addition to their ability to measure angles, each sensor bar can resolve the z-axis position of the intercepting laser beam. As the laser rotates, it will strike either two or three photodiodes depending on the height of the sensor board relative to the plane of the laser. When this happens, a voltage signal is generated by each illuminated photodiode. In addition to being processed by the timing circuitry discussed previously, these signals also get fed into an array of analog multiplexers. The host computer controls the output of each multiplexer, which is then filtered, amplified, and fed into a peak-hold circuit. Multiplexer control is accomplished by a USB DAQ device such as from Measurement Computing, which simultaneously monitors the output voltage from the six multiplexers. In this way, the peak voltage from each photodiode can be independently measured.

Once the voltage levels of each photodiode are known, the z-axis position of the sensor bar can be computed in a variety of ways. In general, since we know the position of each photodiode with respect to the sensor board, determining z-position with respect to the incident laser stripe is a matter of correlating photodiode voltages with laser position.

Another embodiment of the present invention uses 6-DOF measurements, but strives for significantly increased resolution and performance. To increase x-y positional resolution, we must increase the resolution of angles $\alpha$, $\beta$, $\phi$, and $\theta$. This has been done in two main ways—by increasing the resolution of the counter and by decreasing the rate of variation in the motor's angular velocity.

To better measure the time between laser-photodiode strikes, a higher-speed counter has been developed, such as a 32-bit. 175 MHz counter using a Spartan-3AN FPGA. For simplicity, the value of the FPGA counter is sent to a microcontroller (such as an ATMega164P) after each pertinent photodiode pulse. The MCU then communicates this timing data to the host computer via an RS-232 serial connection. In other embodiments of the present invention, the FPGA may be replaced by a smaller but faster CPLD which can be programmed to run multiple counters simultaneously.

In addition to improving the counter frequency, we have taken steps to ensure that clean, accurate signals are received from the photodiodes.

The second step in improving angular resolution is to improve the velocity stability of the rotating mirror. To slow changes in speed, we have mounted the mirror to a 14.3 lb steel flywheel. This is attached to the motor through a belt drive. The increased inertia of the flywheel greatly slows changes in speed caused by variations in the motor. Furthermore, the rubber belt which links the motor and flywheel shaft acts as a kind of shock absorber. It helps to prevent any sudden variations in motor speed from reaching the flywheel and affecting the rotational velocity of the mirror.

In some embodiments of the present invention, one may decrease the rotational speed of the mirror from 10,000 RPM down to 800 RPM. By reducing the rotational velocity of the mirror and increasing the frequency of the counter, one may resolve angular changes as small as ±0.0549 millidegrees.

Although decreasing the rotational velocity of the mirror increases angular resolution, it also slows down the overall update rate of the system. With a single-sided mirror rotating at 800 RPM, our position is only measured at a rate of 13.33 Hertz. To overcome this limitation, the single-sided mirror will be replaced by a six or eight-sided mirror. In the case of an eight-sided mirror, our measurement frequency increases to almost 107 Hertz. The only downside of a multifaceted mirror is that it limits the range of angles which can be measured. However, an eight-sided mirror still provides a 90° measurement window, which should be more than enough for most applications.

The digital counter is started and stopped based on the output from a comparator. When the voltage output from the photodiode circuitry crosses a certain threshold, the comparator output goes high, triggering the counter.

When operating outdoors on sunny days, photodiode arrays will experience a significantly higher level of overall illumination. This is predominately because BPW34 photodiodes or similar are most sensitive to an infrared (IR) wavelength of 900 nm. Indoor lighting emits relatively little infrared light. The sun, however, is an enormous source of IR radiation.

Fortunately, most sources of ambient light, like the sun, don't change their level of light output very quickly. Thus, we can apply an electrical high-pass filter which will block out any steady-state level of illumination while still allowing the laser-triggered photodiode pulses to pass.

A significantly high level of ambient illumination, while removable electronically, could still impair the ability to perform accurate threshold-based timing. Thus, we have tested a couple varieties of optical IR-cut filters. To perform each test, a single photodiode was connected to a 5 Volt supply in series with a 1.6 kiloohm resistor, without electronic filtering or amplification. It was then covered with different filter materials and tested indoors and outdoors, with and without steady-state laser illumination. The results of this test are summarized in the following table:

| IR-Cut Filter Test Data | | | |
|---|---|---|---|
| Test Condition | No Filter | Wowfil Super IR 6599 | Wowfil Super IR 7090 |
| Indoors. | | | |
| Ambient Light Indoors. | 11.4 mV | 7.3 mV | 7.8 mV |
| Laser Illumination | 1462 mV | 990 mV | 1102 mV |

-continued

IR-Cut Filter Test Data

| Test Condition | No Filter | Wowfil Super IR 6599 | Wowfil Super IR 7090 |
|---|---|---|---|
| Outdoors. | | | |
| Ambient Light Outdoors. | 1792 mV | 652 mV | 708 mV |
| Laser Illumination | 2685 mV | 1253 mV | 1428 mV |

The results of these tests clearly indicate the advantages of using an optical filter with the photodiodes. The Wowfil Super IR 7090, for example, cuts down on ambient light by about 60% while still allowing a significant and detectable amount of laser light (635 nanometer) to pass through.

Measurement of X and Y Position

Figure 27:
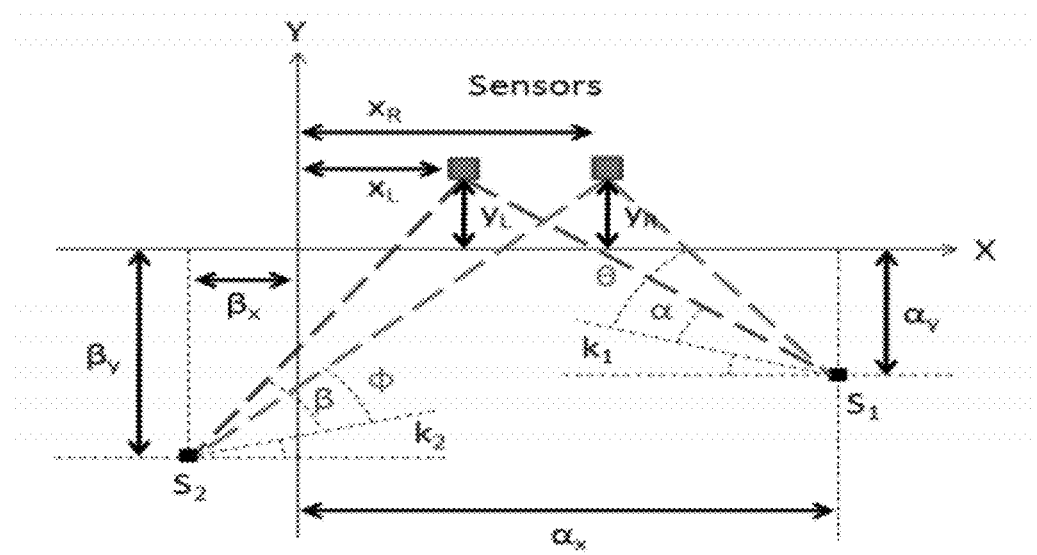
FIG. 27 is a diagram depicting positional measurement layout, front view.

To resolve each sensor's x (horizontal) and y (vertical) coordinates requires two angular measurements made from known points $S_1$ and $S_2$. Six constants define the location and orientation of these two angular measurement stations. Constants $\alpha_x$, $\alpha_y$, $\beta_x$, and $\beta_y$ define the x and y locations of the right and left angular measurement beacons respectively. The constants $k_1$ and $k_2$ define the angular offset of the angular measurements. FIG. 27 is a diagram depicting Positional Measurement Layout, Front View.

In the case of the left sensor, once these constants are known, measurement of the angles $\alpha$ and $\beta$ allows for direct calculation of $x_L$ and $y_L$ based on the following formulae:

$$x_L = \frac{\beta_y + \text{TAN}(\alpha + k_1) - \text{TAN}(\beta + k_2)\beta_x - \alpha_y}{\text{TAN}(\beta + k_2) - \text{TAN}(\alpha + k_1)} \quad \text{Equation 2}$$

$$y_L = \frac{\text{TAN}(\beta + k_2)\text{TAN}(\alpha + k_1)\alpha_x - \text{TAN}(\beta + k_2)\alpha_y - \text{TAN}(\beta + k_2)\text{TAN}(\alpha + k_1)\beta_x + \text{TAN}(\alpha + k_1)\beta_y}{\text{TAN}(\beta + k_2) - \text{TAN}(\alpha + k_1)} \quad \text{Equation 3}$$

Using the same formulae, the angles to the right sensor, $\theta$ and $\phi$, can be plugged in to determine $x_R$ and $Y_R$. Once both sets of coordinates are known, they can be used to determine the x-y location of the point between both sensors, as well as the angle (referred to as roll) between the sensors and the x-axis:

$$x = \frac{x_R + x_L}{2} \quad \text{Equation 4}$$

$$y = \frac{y_R + y_L}{2} \quad \text{Equation 5}$$

$$\text{roll} = \text{ARCTAN}\left(\frac{y_L - y_R}{x_L - x_R}\right) \quad \text{Equation 6}$$

The six constants defined here can either be measured directly or determined through calibration. The method which produces the most accurate results will depend on the circumstances. If the sensors can be placed in three separate points whose x and y coordinates are precisely known, the constants can be computed very accurately. However, if this is not an option, the individual parameters will have to be measured by hand once the laser beacons have been fixed in place.

For testing purposes, the sensors were mounted to the end-effector of a four-axis robotic arm. This allowed us to determine the measurement constants most precisely through computation. The robot was moved to three separate positions, where x and y were measured by the control software. At each point, $\alpha$, $\beta$, $\theta$, and $\phi$ were also measured. Based on these three sets of data, we can construct a set of six equations and six unknowns. This to set of equations is then solved to determine the six unknown constants defined above.

Measurement of Z Position and Yaw

As mentioned, each sensor can be used to measure angles as well as z-axis position with respect to the intersecting laser stripes. The diagram below shows a bottom view of the two sensor bars. Each sensor bar is actually broken into a top and bottom half so that we can separately identify each laser. The right laser beacon will only strike the top half of the sensor while the left laser will only strike the bottom half.

Figure 28:
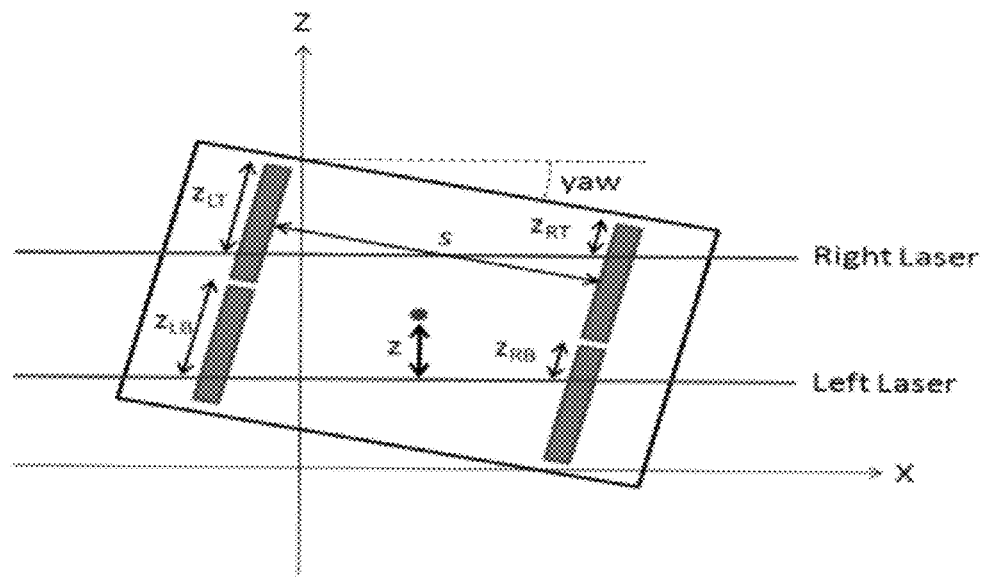
FIG. 28 is a diagram that depicts measuring Z and yaw, bottom view.

FIG. 28 is a diagram that depicts Measuring Z and Yaw, Bottom View

As shown in FIG. 28, with each pass of the laser we can measure four parameters:

$z_{LT}$—represents the distance from the top of the left sensor bar to the right laser stripe $z_{LB}$—represents the distance from the middle of the left sensor bar to the left laser stripe $z_{RT}$—represents the distance from the top of the right sensor bar to the right laser stripe $z_{RB}$—represents the distance from the middle of the right sensor bar to the left laser stripe Using these four parameters we can calculate z—the distance from the center of the sensor board to the left laser, as well as yaw—the angle between the sensor board and the laser planes:

$$z = \text{SIN(yaw)}\left(\frac{S}{2}\right) + \text{COS(yaw)}(z_{RB}) \quad \text{Equation 7}$$

$$\text{yaw} = \text{ARCTAN}\left(\frac{z_{LT} - z_{RT}}{S}\right) \quad \text{Equation 8}$$

Corrections to X and Y Position for Yaw

As yaw increases in either the clockwise or the counter-clockwise direction, it introduces error into the x-y calculations presented above. Equations 2 and 3 do not account for this and expect the top and bottom halves of the sensor bar to be parallel with the z-axis. Thus, if the sensors are rotated clockwise, the right laser will measure a larger angle $\alpha$ while the left laser will measure a smaller angle $\beta$. To compensate for this, we define a few more parameters shown below.

$\beta_h$—the height of one complete sensor bar (constant).

$c_L$—the horizontal distance from the middle of the left sensor bar to a vertical line dropped from the intersection of the right laser and the top portion of the sensor bar.

$d_L$—the horizontal distance from the intersection of the left laser and the bottom portion of the left sensor bar to a vertical line dropped from the middle of the sensor bar.

Figure 29:
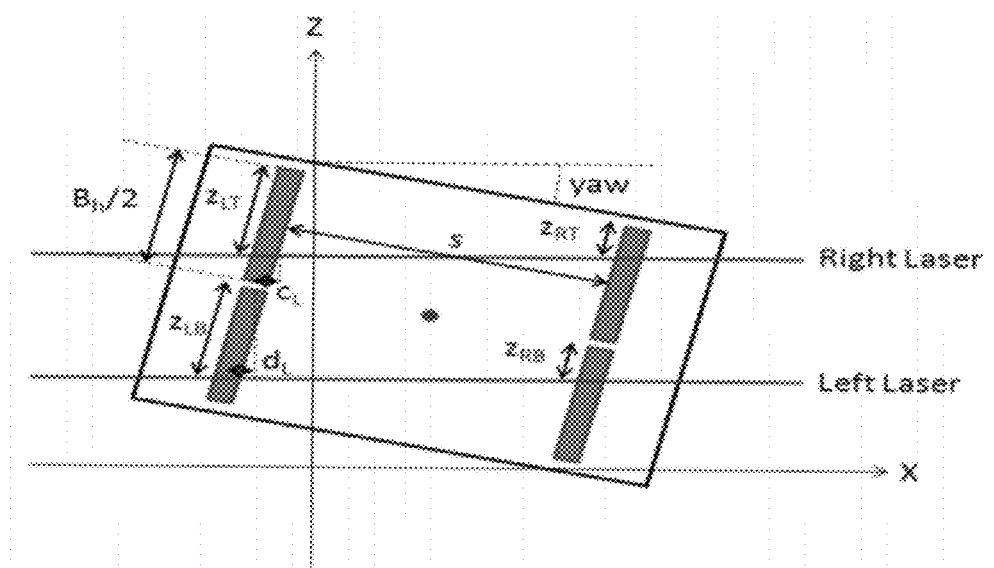
FIG. 29 depicts X-Y yaw corrections, bottom view.

FIG. 29 depicts X-Y Yaw Corrections. Bottom View.

Using these parameters we can derive a set of equations for correcting the x and y errors. First, the horizontal distances $c_L$, and $d_L$ are computed as follows:

$$c_L = \text{SIN(yaw)}\left(\frac{B_h}{2} - z_{LT}\right) \quad \text{Equation 9}$$

$$d_L = \text{SIN(yaw)}z_{LB} \quad \text{Equation 10}$$

Switching to a front view once more, we can more clearly see how yaw affects the initial calculation of position. With a clockwise yaw, the measured angle α increases while β decreases. This yields a calculated position with a larger $y_L$ value and a smaller $x_L$.

Figure 30:
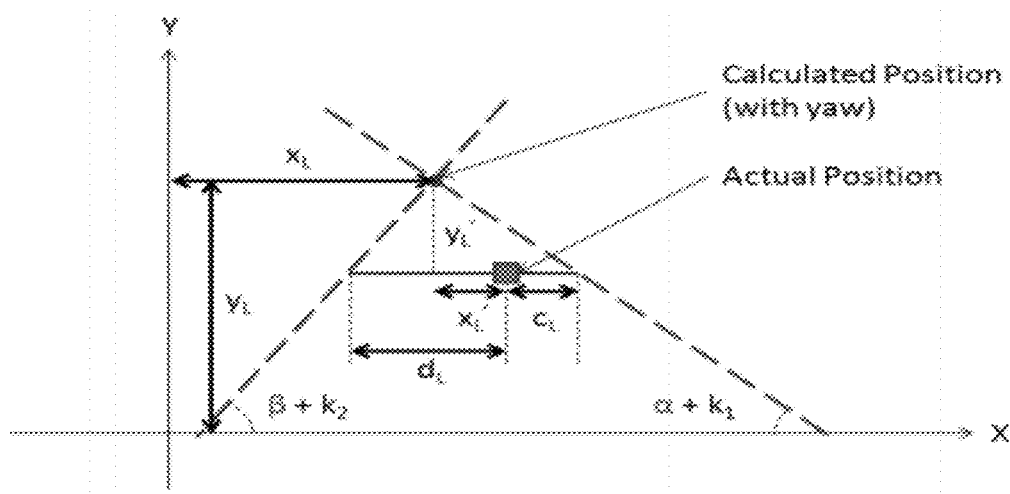
FIG. 30 depicts X-Y Yaw Corrections. Front View.

FIG. 30 depicts X-Y Yaw Corrections, Front View.

To compensate for these differences, we need to calculate the values of the offsets $x_L$ and $y_L$. Doing so yields the following formulae:

$$x'_L = \frac{TAN(\beta+k_2)d_L - TAN(\alpha+k_1)c_L}{TAN(\beta+k_2) + TAN(\alpha+k_1)} \quad \text{Equation 11}$$

$$y'_L = \frac{TAN(\alpha+k_1)TAN(\beta+k_2)(c_L+d_L)}{TAN(\beta+k_2) + TAN(\alpha+k_1)} \quad \text{Equation 12}$$

Finally, the true values for $x_L$ and $y_L$ can be determined by adding $x_L$ and subtracting $y_L$ to the results of Equations 2 and 3. Corrections can be made to the x and y coordinates of the right sensor using precisely the same equations, but substituting in equivalent parameters measured at the right board.

Measuring Pitch and Roll

Figure 31:
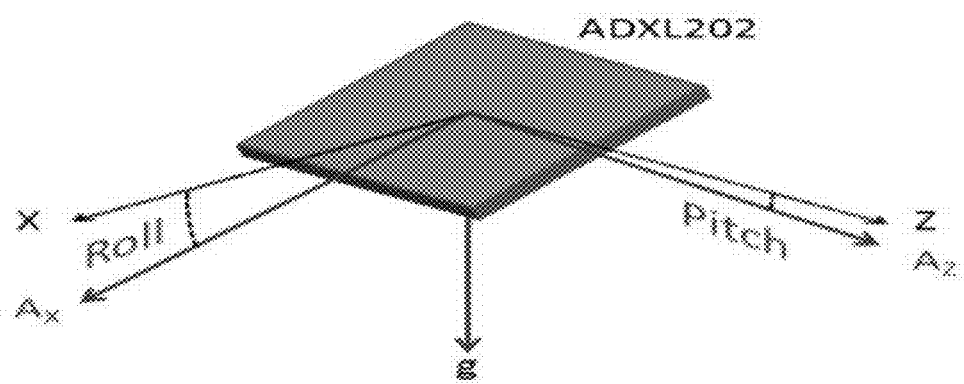
FIG. 31 depicts an accelerometer acting as a tilt sensor.

Pitch and roll can both be measured using a combination of data from the x, y, and z-axes. However, pitch depends on very fine z-axis measurements as well as a precisely-known separation of the two laser planes. Existing sensors may be supplemented with a dual-axis accelerometer, such as, for example, the ADXL202 from Analog Devices. This device can measure ±2 g of both static and dynamic acceleration. A dual-axis accelerometer is used to measure the static acceleration due to gravity. As such, it will act as a dual-axis tilt sensor, as shown in FIG. 31, showing an accelerometer acting as a tilt sensor. The two values of acceleration provided by the accelerometer can be easily converted into values for pitch and roll by using the following formulae:

$$\text{pitch} = ARCSIN\left(\frac{A_x}{1g}\right) \quad \text{Equation 13}$$

$$\text{roll} = ARCSIN\left(\frac{A_z}{1g}\right) \quad \text{Equation 14}$$

Based on values given in the datasheet for the ADXL202, resolutions of less than one degree are achievable. The ADXL202 outputs digital signals whose duty cycles are proportional to the acceleration in the two sensitive directions. These pulse widths are measured by a microcontroller and communicated to a host PC running data acquisition software. The acceleration values can also be integrated twice yielding the net change in position as a way to improve the overall update rate of the system. However, since the integration of acceleration can cause error to compound over time, it will be necessary to implement a method for the system to periodically reset based on the more accurately-known data coming from the x-y sensing algorithm.

Resolution in X and Y Position

As mentioned, the x-y positional resolution of the system is dependent on its angular resolution. In light of this fact, small angles and angles close to 90° should be avoided. This is because as the measured angle approaches 0° or 90°, the angular resolution must approach zero degrees in order to resolve motion. This is impossible for any real sensor. Thus, the sensors should always be kept at some small distance from the far left and far right sides of the measurement window depicted. Similarly, if the object approaches zero height with respect to the angular sensors, the required angular resolution must approach zero in order to resolve the sensors' horizontal motion.

In light of these restrictions, we must place certain limitations on the allowed travel of the object to be measured. As an example, consider the case of measurements taken by two sensors over a 15 meter wide area with a desired vertical and horizontal resolution of 1/16 inch (1.6 millimeters). The two sensors will be placed at the same vertical location, such that $\beta_y = \alpha_y$. The object will be limited in motion along its x-axis such that 1 meter<x<14 meters. Put simply, the object is always a minimum horizontal distance of 1 meter from both lasers.

Figure 32:
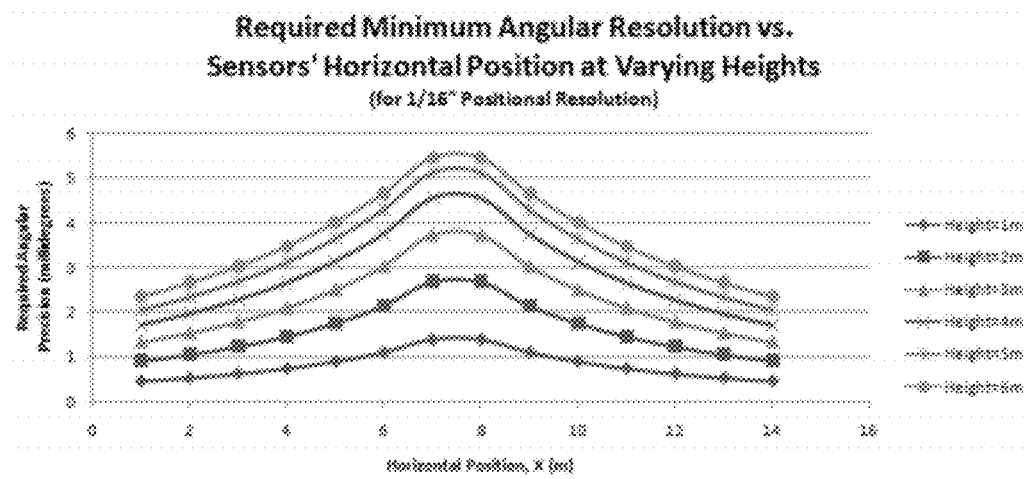
FIG. 32 is a graph of required angular resolution vs. sensor location.

To determine the required angular resolution at any given point, we first compute the change in angles which result from moving the sensors horizontal by 1/16". Next, the same difference in angles is measured for a vertical movement of 1/16". In total, four angular differences are computed. The smallest of the four values is recorded, and represents the minimum required angular resolution to detect a 1/16" movement in any direction. A graph of the results is plotted against various heights in FIG. 32, which is a graph of Required Angular Resolution vs. Sensors' Location (for 1/16 inch positional resolution).

Based on this graph, as the object's height begins to increase, the required angular resolution quickly increases from zero. Ultimately the required resolution will again drop towards zero as height approaches infinity. The angle sensors could also be spaced further apart to reduce the required resolution, but if their spacing is too great, angular resolution must again become more precise to maintain positional resolution.

Therefore if 1/16 inch is our target positional resolution, we will want to resolve angular changes of 0.5 millidegrees or less. However, the method for correlating angular and positional resolutions presented above is actually very conservative. In reality, an angular resolution of 0.5 millidegrees will yield positional resolutions on the order of 0.01 inch over a 15 meter×9 meter area. This is because the resolution of both angular measurements, when taken together, limits the potential variation in sensor x-y position.

Consider the case when the sensors are at x=14 meters and y=1 meter. According to the previous graph, this is the point at which our best (0.5 millidegree) angular resolution is required. This is because the shallow left angle (β=4.0856°) will not vary much when the sensors are moved 1/16" horizontally. In fact, if this angle were 0°, a horizontal motion of any amount would produce zero variation in angle. As mentioned before, this condition must be avoided during operation.

Figure 33:
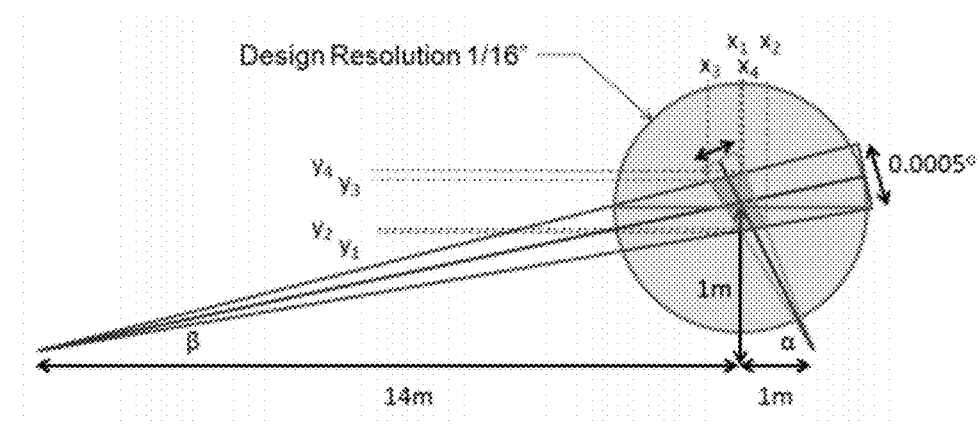
FIG. 33 is a diagram depicting computing actual positional resolution.

FIG. 33 is a diagram depicting computing actual positional resolution, and illustrates the reason for our initial 0.5 millidegree requirement. The point at which the angles α and intersect is the actual location of the sensor. The two outer lines near β indicate the limits of variation for the measurement of the left angle β. Similarly, the two outer lines near α indicate the limits of variation for α. The green circle is centered upon the sensor's location. Its diameter indicates an acceptable positional resolution of 1/16" or better.

As mentioned, the need for the left angle to resolve horizontal motion has set our required angular resolution at 0.5 millidegrees. FIG. 33 shows that the limits of variation for intersect the perimeter of the circle at its furthest left and furthest right points. A horizontal line has been drawn between these two points.

Now since the sensor must lie somewhere within the tolerances of both the left and right angles, it must be located within the intersection of these angles. This quadrilateral area has been indicated by a shaded region. We can calculate the locations of the four corners of this quadrilateral using the specified angular resolution. The results are:

| | | |
|---|---|---|
| $x_1 = 0.09832$ mm | $y_1 = 0.11580$ mm | $d_1 = 0.15191$ mm |
| $x_2 = 0.13090$ mm | $y_2 = 0.11340$ mm | $d_2 = 0.17319$ mm |
| $x_3 = 0.13090$ mm | $y_3 = 0.11340$ mm | $d_3 = 0.17319$ mm |
| $x_4 = 0.09832$ mm | $y_4 = 0.11580$ mm | $d_4 = 0.15191$ mm |

As it turns out, the distance from the actual location of the sensor (the center of the circle) to any of the four corners of the shaded region is less than 0.18 millimeters (0.007 inches). This means that the positional resolution at the point x=14 meters, y=1 meter is almost ten times better than the expected 1/16 inch.

The graph below shows the results of this same calculation applied to hundreds of points within a 15 meter×9 meter sensing area. As expected, positional resolution is worst at coordinates where the measured angle approaches zero degrees (low values for y). However, even at the worst-case location (where x=7.5 meters, y=0.5 meter), our positional resolution is still 0.038 inch. On average, a 0.5 millidegree angular resolution will achieve a positional resolution of 0.009 inch.

Figure 34:
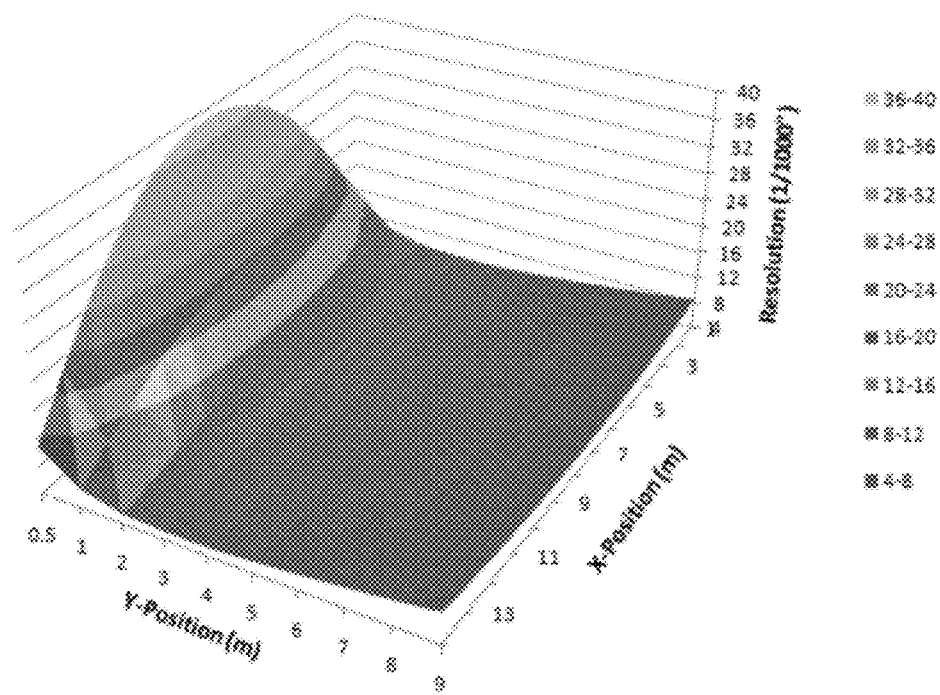
FIG. 34 depicts positional resolution at various locations.

FIG. 34 depicts Positional Resolution at Various Locations (0.5 millidegree Resolution). One embodiment of the present invention doubles the number of sensors and laser beacons. The two extra beacons would be placed at the top left and top right corners of the area to be measured. These beacons would provide additional angular measurements which would greatly enhance positional resolution at y-positions close to zero. The beacons located at the top of the measurement area would have poor resolution at high y-positions, but this would be compensated for by the lower pair of measurement beacons.

Resolution in Z Position

Sensing along the z-axis of the sensor bar is accomplished by reading the peak voltages from individual photodiodes. Given the current spacing of the photodiodes at 2.5 millimeters on-center and a laser stripe width of about 3 millimeters (dependant on focus and distance), the laser will illuminate either two or three photodiodes in a single pass.

Since each photodiode-resistor combination will produce slightly different peak voltages, the best way to determine the resolution of the current setup is to actually measure the output of several photodiodes as they're moved along the laser stripe. The results of such a test using four photodiodes are shown below. Each line represents the peak voltage output from a particular photodiode at a specific z-axis position. As each photodiode is moved through the laser stripe it produces a fairly Gaussian profile.

Figure 35:
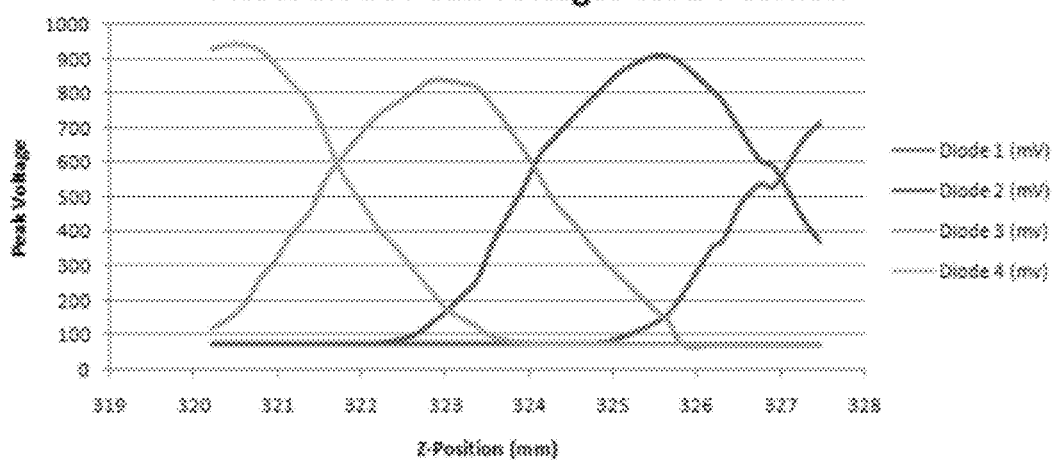
FIG. 35 shows photodiode peak voltages vs. Z-position.

FIG. 35 shows Photodiode Peak Voltages vs. Z-Position. Since we know where each photodiode is located within the sensor bar, we can use the measured voltages of each photodiode to determine where the laser is striking. In the simplest approach, we would first read the voltage of every photodiode on the sensor bar. Then we would determine which of them produced the highest voltage. The location of this photodiode would then be equal to the current z-position. Of course, this means our resolution is only as good as the photodiode spacing −2.5 millimeters.

Another approach would be to apply a weighted-average style formula. We first scan the entire sensor bar to determine which photodiode is producing the highest output voltage. The known position of this photodiode with respect to the edge of the sensor board is then multiplied by its voltage. The positions of the two photodiodes to each side of the brightest photodiode are also multiplied by their voltages. The sum of these three terms is then divided by the sum of the three voltages, as shown here:

$$z_{LT} = \frac{v[i-1]p[i-1] + v[i]p[i] + v[i+1]p[i+1]}{v[i-1] + v[i] + v[i+1]} \quad \text{Equation 15}$$

In this equation, v[i] represents the voltage of the most illuminated photodiode, and v[i+1] and v[i−1] represent the voltages of the photodiodes to the left and right. Similarly, p[i] represents the position of the most illuminated photodiode, while p[i+1] and p[i−1] represent the positions of the photodiodes to the left and right. Before applying this algorithm, the DC offsets were removed. These offsets are caused by ambient lighting and would normally be removed by high-pass filtering. The results of this test were compared to the actual z values, yielding the graph shown below.

Figure 36:
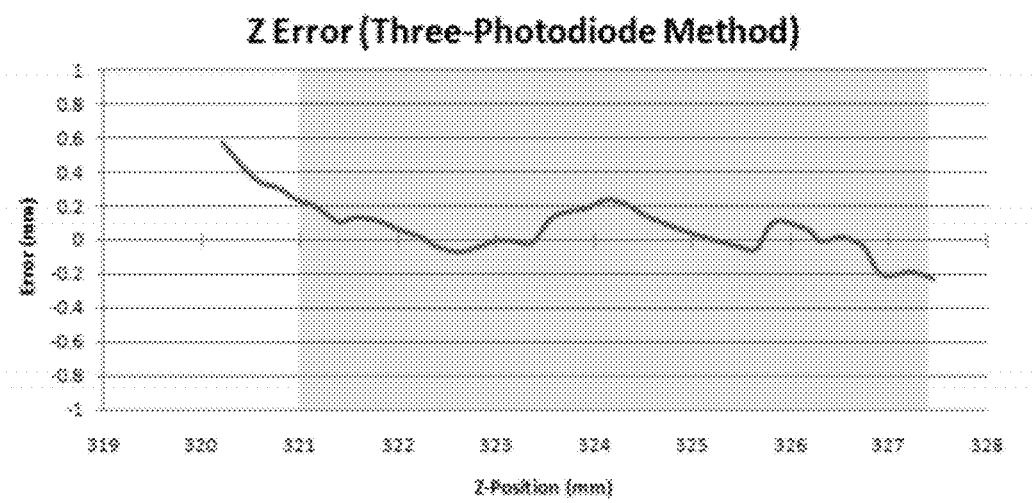
FIG. 36 shows the results of the three photodiode Method for Z-position sensing.

FIG. 36 shows the results of the three photodiode Method for Z-position sensing. Clearly this is a dramatic improvement over simply finding the location of the most illuminated photodiode. Discounting the far edges where only two photodiodes are active, we have a z-position resolution of ±0.3 millimeters. In practice the sensor bar will be long enough that the end diodes will never be passed, eliminating the higher errors shown outside the shaded blue region above.

To further improve resolution in the z-axis, the graph clearly shows that the diodes are not completely uniform: at peak illumination, the output voltage varies between each photodiode. This variation leads to increased error between diode pairs that have significantly different maximum peak voltages. This problem can be resolved by scaling the measured voltages. To scale the voltages we simply divide the measured voltage by the maximum measured peak voltage for that photodiode. This normalizes the measured voltages across the entire array.

Figure 37:
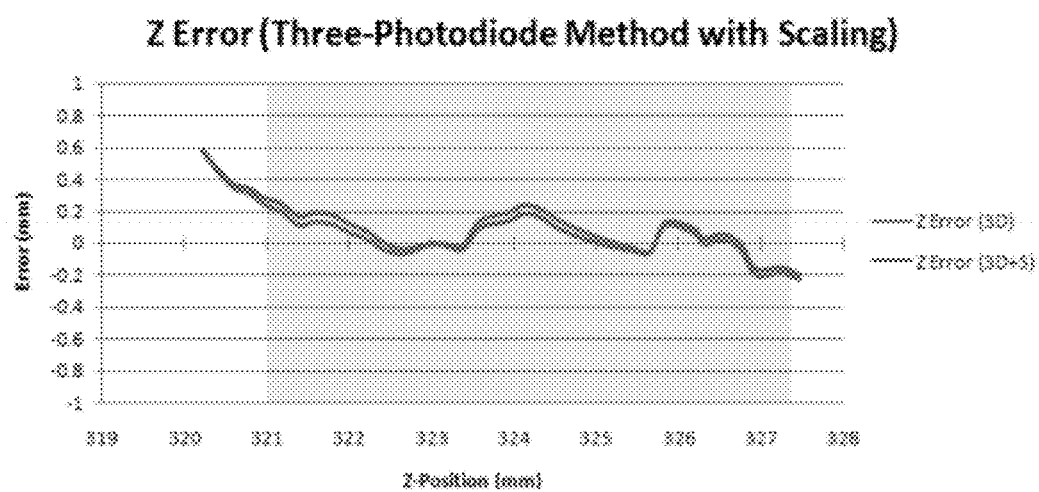
FIG. 37 depicts the results of the three photodiode method with scaling.

FIG. 37 depicts the results of the three photodiode method with scaling. Unfortunately we found that scaling the voltages results in approximately the same average error and standard deviation as not scaling the values. This Figure demonstrates that sometimes scaling reduces error, but sometimes increases it. A summary of both methods is shown below:

| | Three-Diode Method | Three-Diode Method Scaled |
|---|---|---|
| Average Absolute Error (mm) | 0.139 | 0.141 |
| Maximum Error (mm) | 0.573 | 0.587 |
| Standard Deviation (mm) | 0.172 | 0.169 |

Error Comparison of Z-Axis Position Sensing Algorithms

Further improvements to z-axis sensing are achieved by redesigning the hardware to eliminate all positions where less than three photodiodes are struck by the beam. It may also be desirable to decrease the time taken to scan the diodes by scanning only diodes adjacent to the previous laser strike, effectively tracking the laser on the array. This method will significantly reduce the number of diodes scanned, allowing for an equivalent reduction in scanning time and an increased refresh rate.

Figure 12:
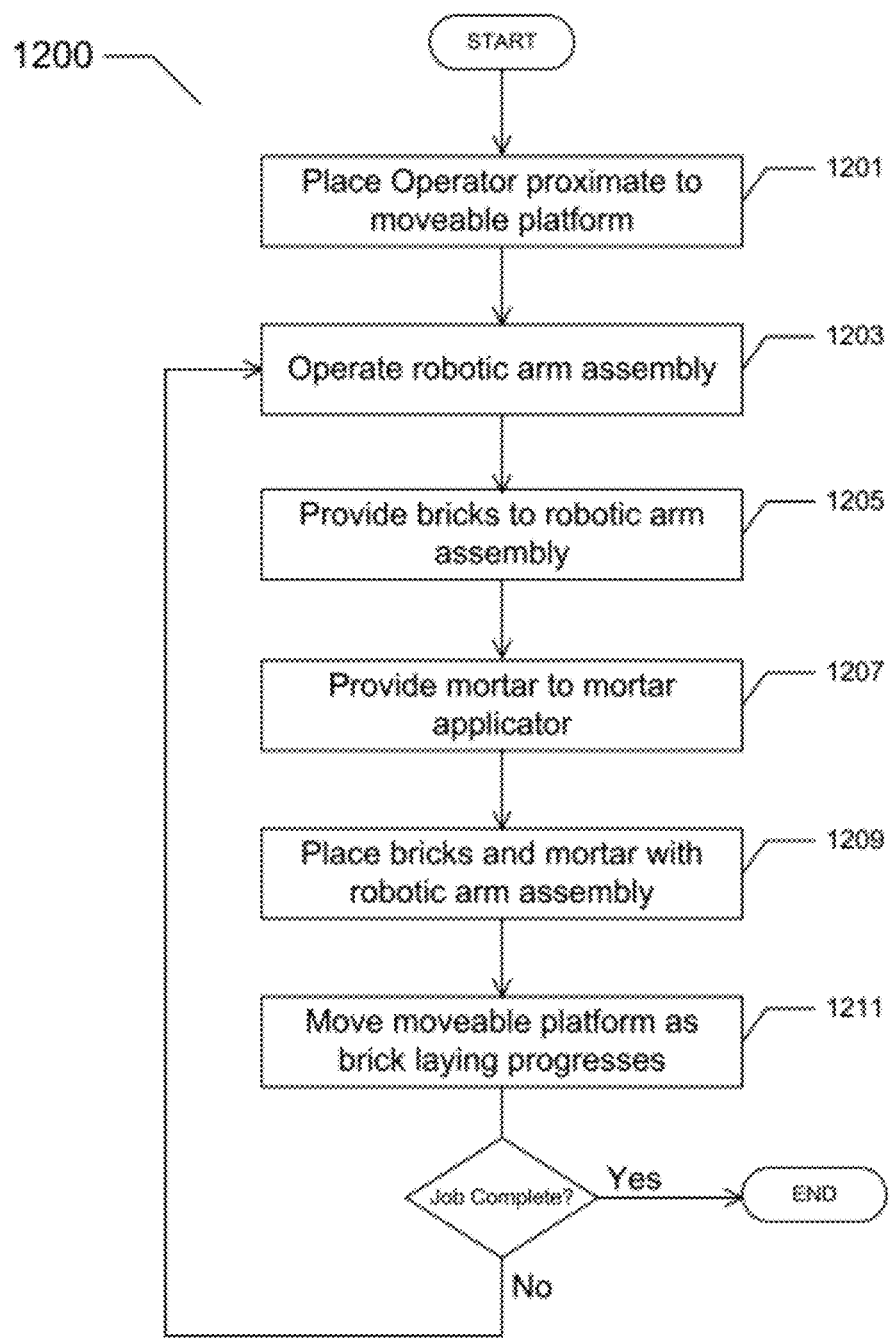
FIG. 12 is a flowchart of a method for laying bricks according to one embodiment of the present invention.

Turning back to FIG. 12, a flowchart depicting a method for laying bricks according to one embodiment of the present invention is depicted. A moveable platform is provided and an operator such as a mason or skilled worker is placed proximate the moveable platform in step 1201. A robotic arm assembly that is operatively coupled to the moveable platform is operated in step 1203 and bricks are provided to the robotic arm assembly in step 1205. In addition, mortar is provided to a mortar applicator in step 1207 and the bricks and mortar are placed with the robotic arm assembly in step 1209. The operator is performing skilled workmanship by ensuring quality control, operating the robotic arm assembly, and generally using the robotic arm assembly as an advanced tool to reduce or eliminate the labor intensive part of brick laying such that the operator can focus on the craftsmanship aspects of brick laying rather than the manual labor aspect of the work. In step 1211 the moveable platform is moved along the structure being built as brick laying progresses until the job is complete.

Figure 13:
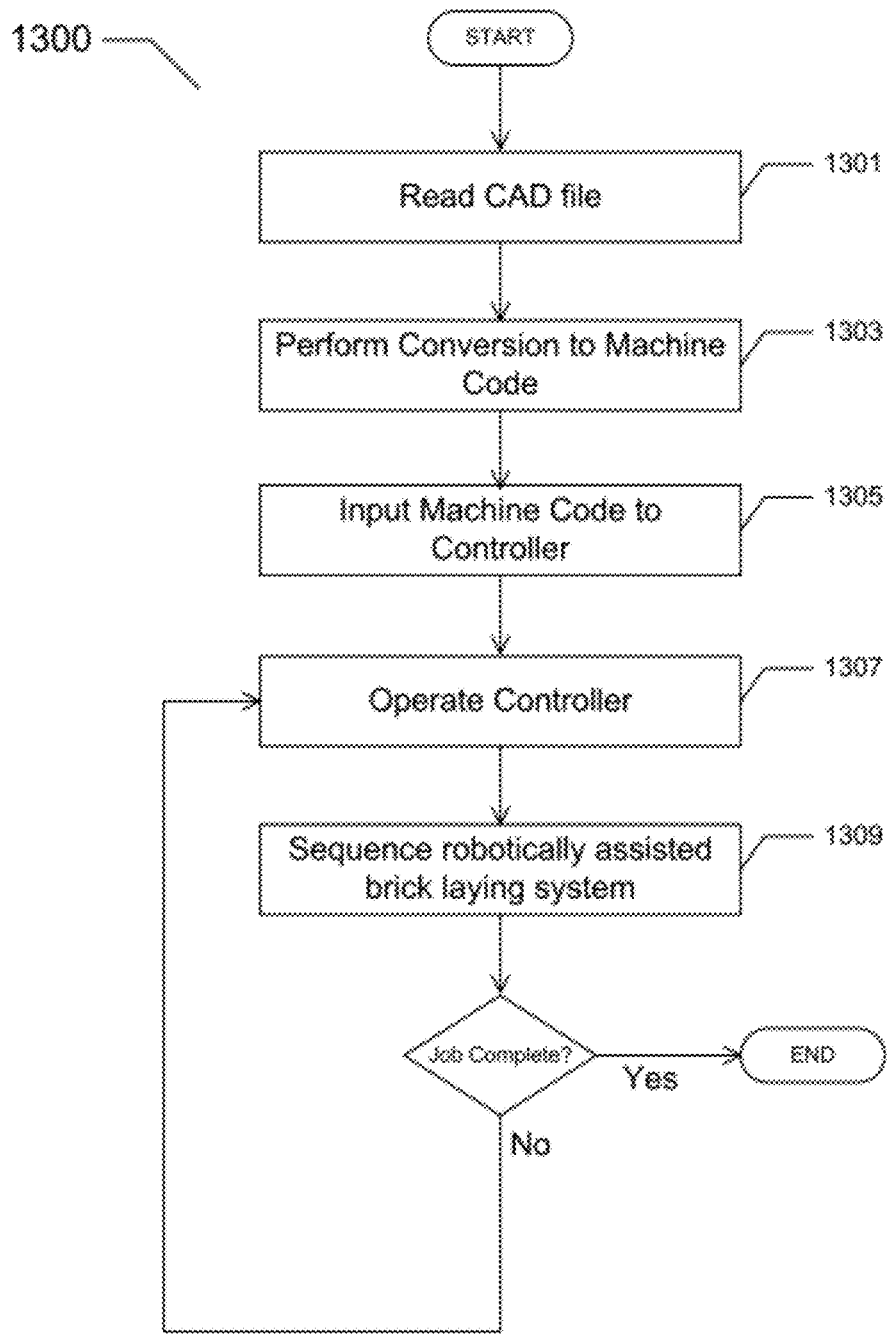
FIG. 13 depicts the conversion process from CAD drawing to machine language.

To facilitate automation of the processes, systems, methods and devices of the present invention, the ability to convert a CAD file such as a file built in Autodesk® AutoCAD® or a similar design program into machine code that can directly control the robotically assisted brick laying system is disclosed herein. FIG. 13 depicts such a process. In step 1301, the CAD file is read and converted in step 1303 to an appropriate machine code file capable of running the various components of the robotically assisted brick laying system of the present invention. For example, the conversion of an AutoCAD file to g-code may be accomplished using software products such as DesKAM 2000. Mill Wizard. CAD-2-CNC, CAM Expert, Geode 2000, Nester, Supercam, and the like. Conversions from other CAD products into other machine languages are also part of the present invention and the various embodiments described and envisioned herein. Once the conversion to machine code is complete in step 1303, the machine code is input to the controller in step 1305, and the controller is operated in step 1307. The controller will then sequence the robotically assisted brick laying system in step 1309 until the job is complete.

Figure 14:
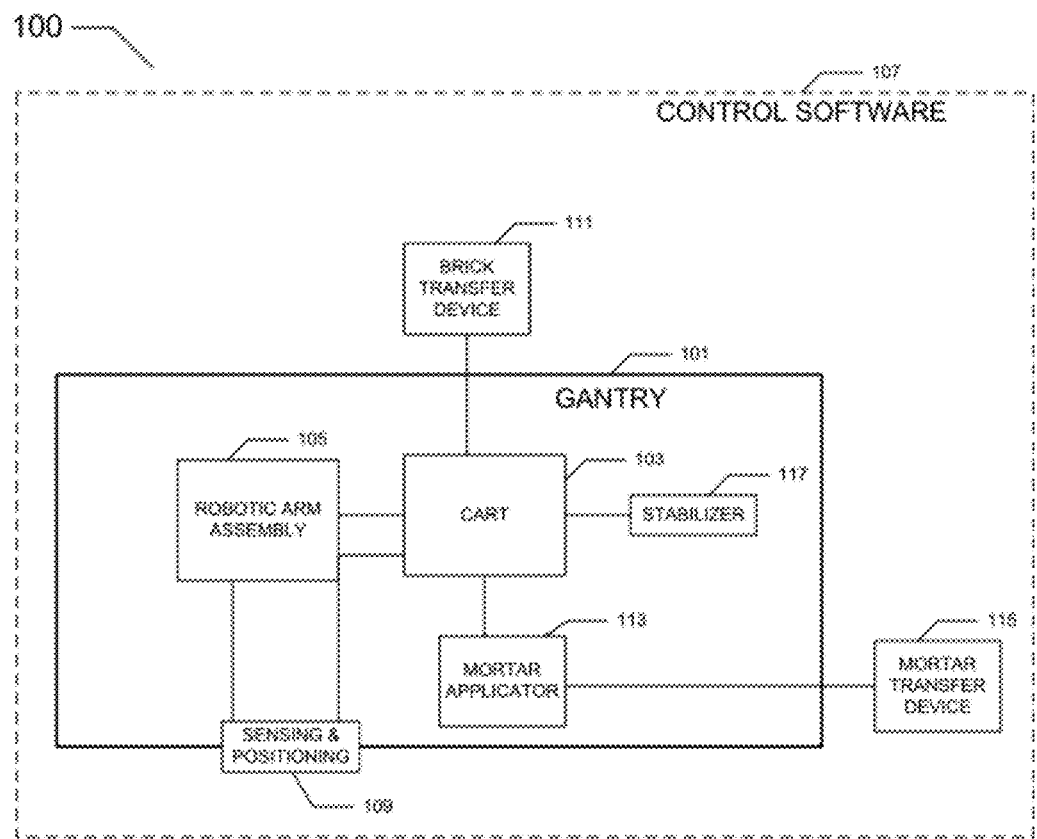
FIG. 14 is a functional block diagram of the Brick Laying System with a moveable cart.

Heretofore, the present invention and the various embodiments described and envisioned herein have been exemplified as having the brick laying system contained in a moveable platform that is coupled to a rough terrain lift or the like. In other embodiments of the present invention the brick laying system of the present invention is contained in a moveable platform that may be, for example, a cart, a vehicle, a platform, a skid, a hoist, or the like. FIG. 14 depicts a functional block, diagram of the Brick Laying System with a moveable platform where the moveable platform is a cart 103. In FIG. 14, a gantry 101 is depicted. The gantry is a physical structure that is placed in proximity to the wall or structure being constructed. A gantry may include, but is not limited to, a rough terrain lift, a cable suspended platform, a mast climbing scaffolding system, a crane suspended basket, traditional gantry, a scaffold, or the like. The gantry contains a cart 103 or similar structure for containing and placing the brick laying system of the present invention. The moveable platform, in this case a cart 103 contains a robotic arm assembly 105. A robotic arm assembly is any device capable of position control, for example. Cartesian coordinate robots, 6 degree of freedom robots, electrically or pneumatically driven servo controlled actuators and automation devices, and the like. The operator is typically a skilled person who works with the robotically assisted brick laying system, ensuring that the system is functioning properly, performing ongoing quality control, and generally providing an overall level of craftsmanship that may be lacking in a fully automated system. The robotic arm assembly 105 moves and places the bricks in the proper position, and contains control software 107 as well as sensing and positioning components 109. Within, on, or in proximity to the gantry 101 is a brick transfer device 111 that moves the bricks from a bundle, pile, or a temporary location into position such that the robotic arm assembly 105 is able to place the bricks in proper position. A mortar applicator 113 is used to dispense mortar onto the bricks as they are being placed in proper position (laid). A mortar transfer device 115 is operatively coupled to the mortar applicator 113 for moving mortar from a retention vessel or container through the mortar applicator 113. As the robotically assisted brick laying system operates, the moveable platform, in this case a cart 103 and the various components that are mechanically interoperable with the moveable platform 103, moves along the gantry by way of a track, wheels, skids, pulleys, rollers, or the like. As a vertical segment of a wall under construction is completed, the gantry is raised vertically to allow the brick laying system to assist an operator in the completion of another vertical segment of wall.

Figure 15:
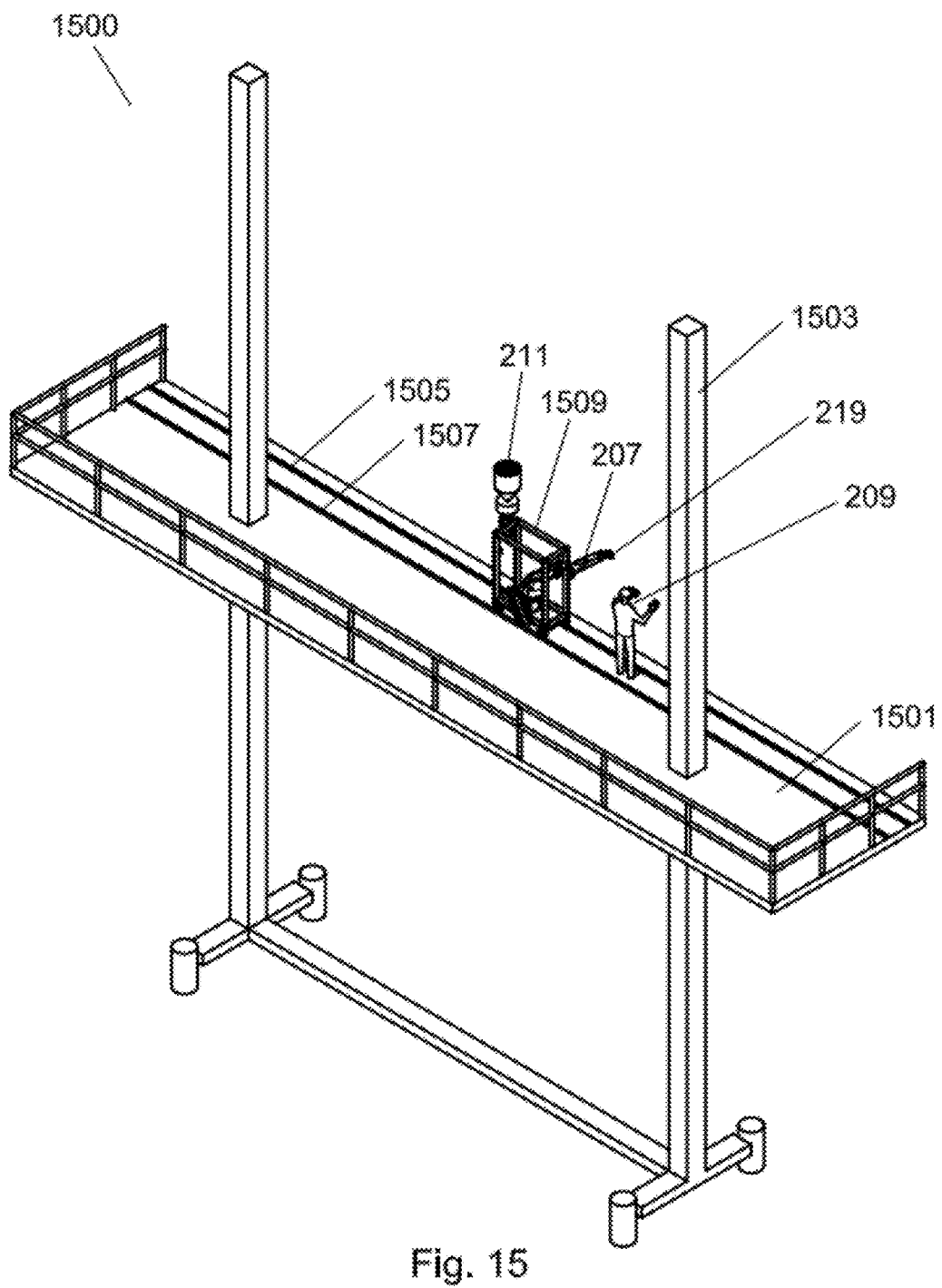
FIG. 15 depicts a gantry and moveable cart configuration of the present invention.
Figure 16:
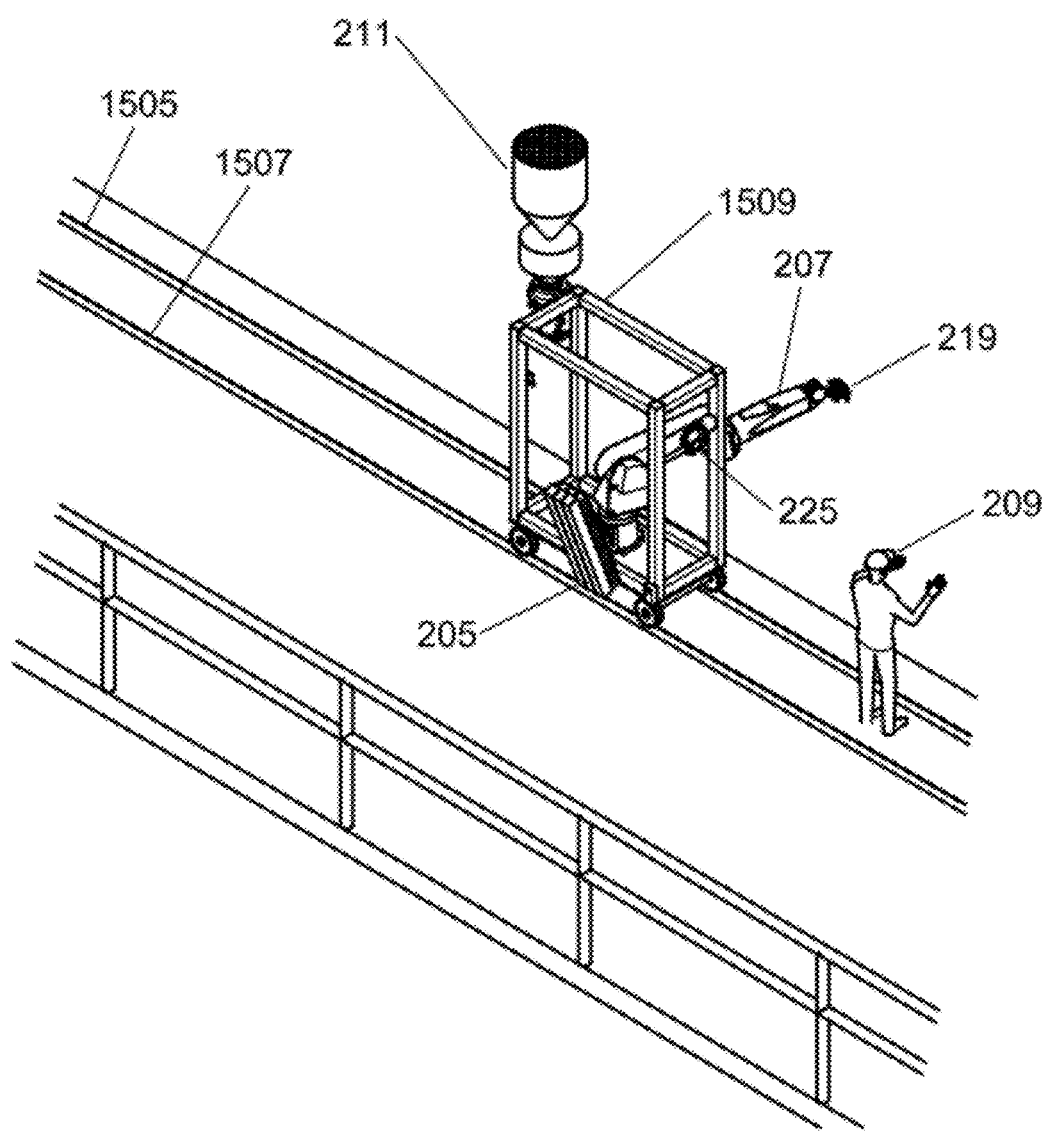
FIG. 16 depicts the moveable cart of FIG. 15 in further detail.

To further describe a brick laying system of the present invention in a gantry and cart configuration, and to further allow one to envision other configurations for the brick laying system of the present invention that may employ a cart, a basket, a platform, a skid, a lift end, or the like. FIGS. 15 and 16 depict a gantry and moveable cart configuration of the present invention. In FIG. 15, the brick laying system 1500 can be seen with a cart and gantry arrangement. A gantry 1501 allows the carted brick laying system, an operator 209 and related equipment and tools to be placed adjacent to a wall under construction. The gantry 1501 moves vertically through gantry supports 1503 and related cabling, hydraulics, motors and related drive equipment. A rail system such as a first rail 1505 and a second rail 1507 can be seen to provide guidance and mobility to the cart 1509 containing the robotic brick laying system. The brick laying system is contained by the cart 1509, and the robotic arm assembly 207 can be seen along with a mortar transfer device and related equipment. FIG. 16 shows a close up depiction of the cart arrangement 1509 where the brick transfer device 205 can be seen along with the robotic arm assembly 207, the end effector 219, the control panel 225, and the mortar transfer device 211. Other components of the brick laying system being previously described and depicted herein. As a wall is constructed, the operator works alongside the brick laying system, and as the bricks are laid and mortar applied, the operator guides the brick laying system horizontally along the gantry, and as a vertical section of wall is completed, the gantry is raised an appropriate amount to allow the beginning of another section of wall.

It is, therefore, apparent that there has been provided, in accordance with the various objects of the present invention, a brick laying system. While the various objects of this invention have been described in conjunction with preferred embodiments thereof, it is evident that many alternatives, modifications, and variations will be apparent to those skilled in the art. Accordingly, it is intended to embrace all such alternatives, modifications and variations that fall within the spirit and broad scope of the present invention as defined by this specification, drawings, and claims.

What is claimed is:

1. A robotically assisted brick laying system, comprising:
   a gantry having a moveable platform;
   a robotic arm assembly mounted to the moveable platform;
   a vibrator mechanically coupled to a brick grasping end effector mounted on the robotic arm assembly;
   a master controller having a processor and memory and containing control software;
   said master controller operatively coupled to a robot controller;

said robot controller providing instructions to said robotic arm assembly;

a mortar applicator mounted to the moveable platform such that the mortar applicator is stationary with respect to the moveable platform;

a mortar transfer device operatively coupled to said mortar applicator; and a brick transfer device.

2. A robotically assisted brick laying system in accordance with claim 1, further comprising an end-effector operatively coupled to said robotic arm assembly.

3. A robotically assisted brick laying system in accordance with claim 2, further comprising a locking mechanism mechanically coupled to said end-effector.

4. A robotically assisted brick laying system in accordance with claim 1, wherein in use said mortar applicator moves in reference to a brick placed by the robotic arm assembly.

5. A robotically assisted brick laying system in accordance with claim 1, wherein in use said mortar applicator stationary in reference to the moveable platform and a brick moves across the mortar applicator by the robotic arm assembly to receive mortar.

6. A robotically assisted brick laying system in accordance with claim 1, further comprising a computer aided design (CAD) drawing to stack plan converter.

7. A robotically assisted brick laying system in accordance with claim 1, further comprising a stack plan input to said master controller.

8. A robotically assisted brick laying system in accordance with claim 1, further comprising a laser configured to generate a laser plane and a sensor for receiving said laser plane.

9. A robotically assisted brick laying system in accordance with claim 1, wherein the robotic arm assembly is mounted on a moveable base on the moveable platform.

10. A robotically assisted brick laying system in accordance with claim 1, further comprising site measurement input to said master controller.

11. A robotically assisted brick laying system in accordance with claim 1, wherein the mortar applicator is selected from the group consisting of a progressive cavity pump, a screw pump, a nozzle, a flexible nozzle, a continuous mortar mixer, a mortar pre-form mold, a pre-made mortar package, a conveyor, a vibratory applicator, an adjustable nozzle, and a stationary nozzle.

12. A robotically assisted brick, laying system in accordance with claim 1, wherein the mortar transfer device is selected from the group consisting of a premixed wet mortar transfer device, a dry mortar transfer device, an in line additive mortar transfer device, and a continuous mix mortar transfer device.

13. A robotically assisted brick laying system in accordance with claim 1, wherein the brick transfer device is selected from the group consisting of a transfer station, a cartridge feed system, and a conveyor.

14. A robotic arm assembly for assisting with the task of bricklaying, the robotic arm assembly comprising:

a mounting structure for attaching the robotic arm assembly to a moveable platform;

a brick grasping appendage;

a vibrator mechanically coupled to the brick grasping appendage for improving adhesion of mortar to a brick;

an operator control station;

an electrical coupling coupled to a controller;

a sensor for determining placement position of the brick; and an interface to a controller for the moveable platform.

15. A method for laying bricks, the method comprising the steps of:

operating a robotic arm assembly attached to a moveable platform;

placing an operator proximate the moveable platform to work with the robotic arm assembly;

providing bricks to the robotic arm assembly;

holding the bricks with an end effector of the robotic arm assembly;

providing mortar to a mortar applicator in proximity to the robotic arm assembly;

moving each brick held by the end effector across the mortar applicator to receive mortar on the brick;

using the robotic arm assembly to place bricks and mortar in a predetermined arrangement;

vibrating the held bricks and mortar with a vibrator attached to the end effector; and moving the moveable platform as brick laying progresses.

* * * * *